US011539498B2

(12) United States Patent
Ashworth et al.

(10) Patent No.: US 11,539,498 B2
(45) Date of Patent: Dec. 27, 2022

(54) CHANNELIZATION FOR SIGNAL BOOSTERS

(71) Applicant: Wilson Electronics, LLC, St. George, UT (US)

(72) Inventors: Chris Ashworth, St. George, UT (US); Patrick Cook, Cedar City, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/917,733

(22) Filed: Jun. 30, 2020

(65) Prior Publication Data

US 2020/0336278 A1 Oct. 22, 2020

Related U.S. Application Data

(63) Continuation of application No. 15/959,107, filed on Apr. 20, 2018, now Pat. No. 10,715,302, which is a
(Continued)

(51) Int. Cl.
H04L 5/14 (2006.01)
H04W 88/08 (2009.01)
(Continued)

(52) U.S. Cl.
CPC .......... H04L 5/14 (2013.01); H04B 7/15542 (2013.01); H04W 72/0413 (2013.01); H04W 88/08 (2013.01)

(58) Field of Classification Search
None
See application file for complete search history.

(56) References Cited

U.S. PATENT DOCUMENTS 4,776,032 A 10/1988 Odate et al.
5,303,395 A 4/1994 Dayani
(Continued)

FOREIGN PATENT DOCUMENTS

EP 1324514 A2 7/2003
EP 1525678 B1 7/2008
(Continued)

OTHER PUBLICATIONS

ADL5513; "1 MHz to 4 GHz, 80 dB Logarithmic Detector / Controller"; Data Sheet; (2008); 25 pages.
(Continued)

Primary Examiner — Chi H Pham
Assistant Examiner — Raul Rivas
(74) Attorney, Agent, or Firm — Thorpe North & Western, LLP

(57) ABSTRACT

Technology for a repeater is disclosed. The repeater can include a signal path that includes a digital filter. The repeater can include a controller. The controller can receive a multi-channel downlink signal. The controller can digitize the multi-channel downlink signal to form a plurality of channelized downlink signals. The controller can determine a base station coupling loss (BSCL) value for each of the channelized downlink signal. The controller can use the digital filter to adjust a gain of one or more of the channelized downlink signals based on the BSCL value for each of the channelized downlink signals.

23 Claims, 22 Drawing Sheets

Related U.S. Application Data continuation-in-part of application No. 15/294,534, filed on Oct. 14, 2016, now Pat. No. 10,225,845, and a continuation-in-part of application No. 15/294,511, filed on Oct. 14, 2016, now Pat. No. 10,212,716.

(60) Provisional application No. 62/241,640, filed on Oct. 14, 2015.

(51) Int. Cl.
*H04W 72/04* (2009.01)
*H04B 7/155* (2006.01)

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,292,652 B1 | 9/2001 | Kim | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,907,891 B2 | 3/2011 | Proctor, Jr. et al. | |
| 7,974,573 B2 | 7/2011 | Dean | |
| 7,986,647 B2 | 7/2011 | Ghadaksaz | |
| 8,049,664 B2 | 11/2011 | Millard et al. | |
| 8,792,536 B2 | 7/2014 | Kwak et al. | |
| 8,816,904 B2 | 8/2014 | Raines et al. | |
| 9,402,106 B1 | 7/2016 | Harris et al. | |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0019604 A1 | 1/2006 | Hasarchi | |
| 2006/0084379 A1 | 4/2006 | O'Neill | |
| 2006/0164160 A1 | 7/2006 | Muhammad et al. | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0113617 A1 | 5/2008 | Braithwaite | |
| 2008/0274718 A1 | 11/2008 | Roper | |
| 2008/0278237 A1 | 11/2008 | Blin | |
| 2008/0293360 A1 | 11/2008 | Maslennikov et al. | |
| 2008/0299896 A1 | 12/2008 | Mohebbi | |
| 2009/0075644 A1 | 3/2009 | Hermel | |
| 2009/0196215 A1 | 8/2009 | Sabat et al. | |
| 2009/0286545 A1* | 11/2009 | Yavuz | H04W 52/367 455/522 |
| 2010/0080154 A1* | 4/2010 | Noh | H04L 5/0092 370/310 |
| 2010/0304751 A1 | 12/2010 | Ji et al. | |
| 2010/0311480 A1 | 12/2010 | Raines et al. | |
| 2011/0151775 A1 | 6/2011 | Kang et al. | |
| 2011/0201269 A1 | 8/2011 | Hobbs et al. | |
| 2012/0243446 A1 | 9/2012 | Mueller et al. | |
| 2013/0077502 A1 | 3/2013 | Gainey et al. | |
| 2013/0177047 A1 | 7/2013 | Kwak et al. | |
| 2013/0329637 A1 | 12/2013 | Kodali et al. | |
| 2014/0011442 A1 | 1/2014 | Dussmann | |
| 2014/0127989 A1 | 5/2014 | Judd et al. | |
| 2014/0200015 A1 | 7/2014 | Kweon et al. | |
| 2015/0003254 A1 | 1/2015 | Sasaki et al. | |
| 2015/0067803 A1 | 3/2015 | Alduaiji | |
| 2015/0382298 A1 | 12/2015 | Müller et al. | |
| 2016/0044488 A1 | 2/2016 | Kim et al. | |
| 2016/0219565 A1 | 7/2016 | Uchino et al. | |
| 2016/0242191 A1 | 8/2016 | Liao et al. | |
| 2017/0027018 A1 | 1/2017 | Langereis et al. | |
| 2017/0223175 A1 | 8/2017 | Abraham et al. | |
| 2017/0265133 A1 | 9/2017 | Chandramouli et al. | |

FOREIGN PATENT DOCUMENTS

| | | | |
|---|---|---|---|
| WO | WO 2010056222 A1 | 5/2010 | |
| WO | WO 2017031194 A1 | 2/2017 | |

OTHER PUBLICATIONS

HMC713LP3E; "54 dB, Logarithmic Detector / Controller, 50-8000 MHz"; Data Sheet; (2010); 12 pages.

HMC909LP4E; "RMS Power Detector Sing-Ended, DC—5.8 GHz"; Data Sheet; (2010); 21 pages.

PIC16F873; "28/40-Pin 8-Bit CMOS FLASH Microcontrollers"; Data Sheet; (2001); 218 pages.

3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

Supplementary European Search Report dated Apr. 16, 2019, in EP Application No. 16856359.1, filed Oct. 14, 2016; 5 pages.

\* cited by examiner

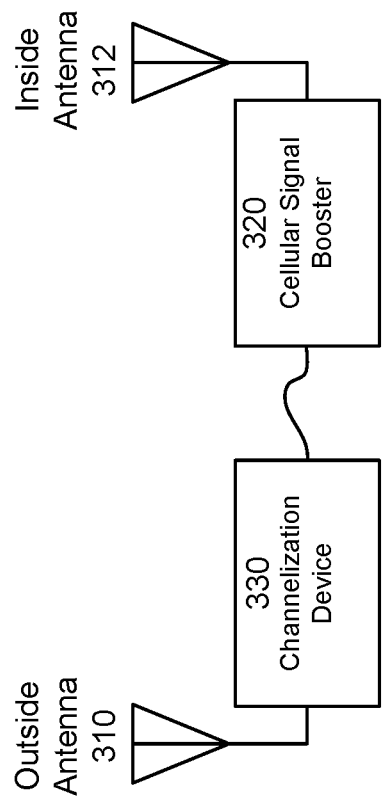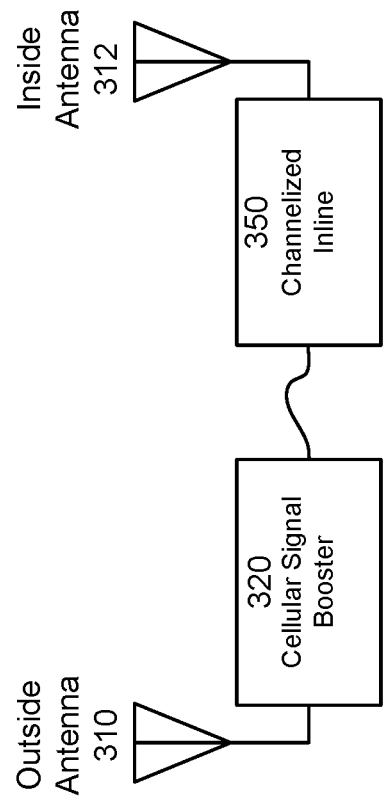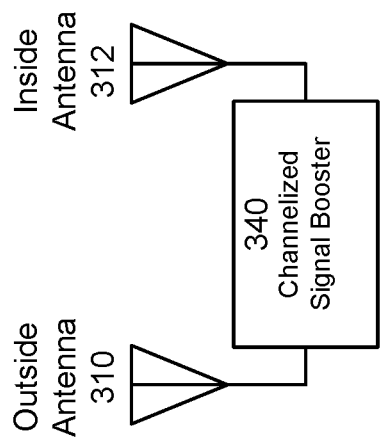

CHANNELIZATION FOR SIGNAL BOOSTERS

RELATED APPLICATIONS

The present application is a continuation of U.S. patent application Ser. No. 15/959,107 filed Apr. 20, 2018, which is a continuation-in-part of U.S. patent application Ser. No. 15/294,511 filed Oct. 14, 2016 and U.S. patent application Ser. No. 15/294,534 filed Oct. 14, 2016, which claim the benefit of U.S. Provisional Application No. 62/241,640 filed Oct. 14, 2015, the entire specifications of which are hereby incorporated by reference in their entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3a illustrates an example of a channelization device in accordance with an example;

FIG. 3b illustrates a channelized signal booster in accordance with an example;

FIG. 3c illustrates an active channelized inline device in accordance with an example;

Figure 1:
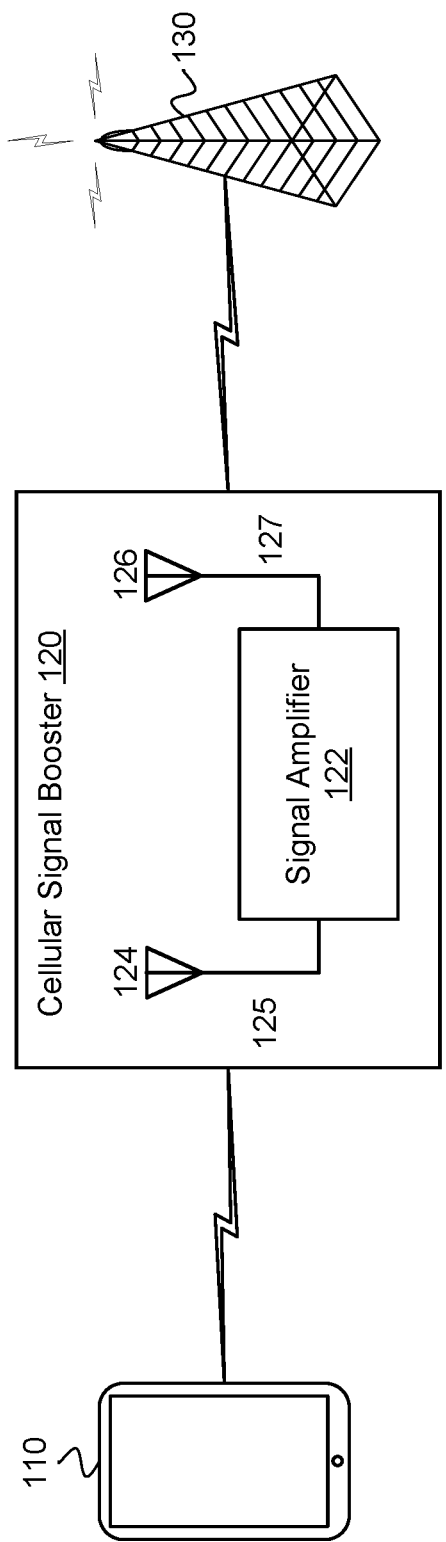
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 110 and transmit DL signals to the wireless device 110 using a single antenna. Alternatively, the integrated device antenna 124 can receive UL signals from the wireless device 110 using a dedicated UL antenna, and the integrated device antenna 124 can transmit DL signals to the wireless device 110 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Modern base stations are configured to communicate with multiple users using Orthogonal Frequency Division Multiple Access (OFDMA). Multiple access can be achieved in OFDMA by assigning subsets of subcarriers in an Orthogonal Frequency Division Multiplexing (OFDM) symbol to individual users by allocating frequency and time resources. In uplink (UL) communications, signals from multiple users in their assigned frequency and time resources are combined in a single OFDM uplink symbol. In order to efficiently detect and process a received UL OFDM symbol at a base station, the amount of power transmitted by each user device is limited to a maximum power. Limiting gain and noise power in an UL transmission to a base station is referred to as a network protection. By limiting the amount of gain and noise power that can be transmitted by a repeater, the amplifiers in the base station are not saturated or overloaded, and the base station noise floor is not significantly increased. The allowable gain and noise power is typically based on the distance or signal loss from the repeater's donor antenna to the base station and the distance from the handset to the repeater's server antenna. In some embodiments, base stations can communicate, to a wireless device, the amount of power that is received in the UL signal from the wireless device to allow the wireless device to actively adjust the UL power to less than the maximum power allowed at the base station.

As previously discussed, signal boosters are typically configured to amplify and/or filter cellular signals, including downlink (DL) and uplink (UL) signals, with limited communications with the base station or the wireless device. For example, a signal booster typically does not include a modem to modulate or demodulate the signals that are amplified. Accordingly, the signal booster typically does not receive any information from the base station regarding the UL power received at the base station from an amplified UL signal communicated from the signal booster.

In order to limit and control the amount of power transmitted in an uplink signal from a signal booster, the signal loss between the signal booster and the base station can be estimated. The signal loss can be referred to as the base station coupling loss (BSCL). This term is also sometimes referred to as the booster station coupling loss. The base station coupling loss is the coupling loss between the signal booster's donor port and the base station's input port.

Theoretically, the UL signal loss and the DL signal loss between base station and signal booster is roughly equivalent. It should be noted that the signal loss is frequency dependent. Accordingly, the UL signal loss can be estimated by receiving a pilot signal, a signal broadcast from in a DL from a base station at a known frequency and power. This measurement can be referred to as the received signal strength indicator (RSSI). The amount of loss of the received pilot signal, relative to the known transmitted power, can be used to estimate how much loss there will be in a transmitted UL signal. Thus, the measured RSSI can be used to estimate the BSCL. The UL signal gain at the signal booster can then be adjusted based on the estimated BSCL, to maximize the amount of power transmitted while meeting the limitations of the maximum uplink signal power received at the base station.

Differences between the way in which booster stations operate and the operation of wireless devices, such as mobile stations or user equipment, can cause inaccuracies in the BSCL measurement at a cellular booster station. These inaccuracies can cause significant differences between the predetermined maximum uplink signal power level at the base station, and the actual received uplink signal power level from the signal booster UL signal. The differences typically reduce the UL signal power level transmitted by the signal booster and limit the range of wireless devices using the signal booster to communicate.

One difference between the operation of signal boosters and wireless devices is the bandwidth in which they operate. Wireless devices, such as user equipment (UEs) or mobile stations (MSs) that are designed to communicate using cellular bands, typically communicate using a signal that is narrow band relative to the signal boosters. For example, the downlink band of 3GPP LTE band 2 is 60 MHz. However, a UE will use only a small portion of that bandwidth. The UE bandwidth may be 1.4, 3, 5, 10, 15, or 20 MHz.

In contrast, a signal booster is typically designed to operate over the entire bandwidth of a selected band, such as band 2, which has a downlink bandwidth of 60 MHz. The signal booster can simultaneously receive multiple DL signals in a single band. A radio frequency detector operating at the signal booster will detect the combined power of all of the DL signals in the selected band. This will cause the received signal strength indicator (RSSI), as measured at the signal booster, to be greater than the actual RSSI for a single user of the signal booster. The increased RSSI (decreased BSCL) of the DL signal power in the selected band at the signal booster will result in a reduced gain and/or noise power applied to the UL signal of a user that is transmitted by the signal booster, thereby limiting the range of the user.

Figure 2:
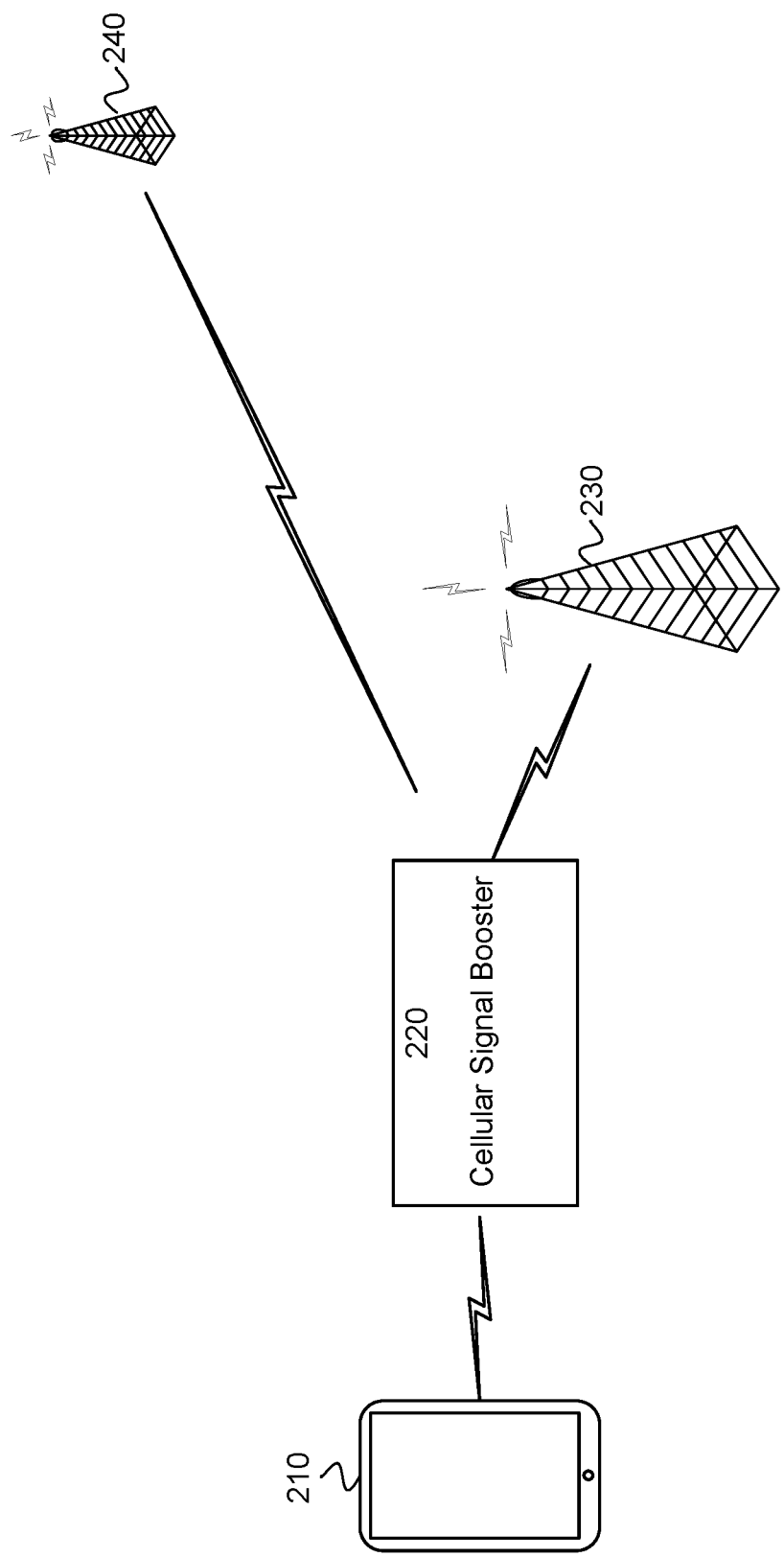
FIG. 2 illustrates a signal booster in communicate with a relatively close base station and a relatively distant base station in accordance with an example.

In addition, the location of multiple base stations relative to the signal booster can also cause inaccuracies in the BSCL measurement. For example, FIG. 2 shows a wireless device 210 in communication with a signal booster 220. The signal booster can receive signals from multiple base stations, such as the relatively close base station 230 and the relatively distant base station 240.

Signal boosters 220 are typically employed to enable one or more wireless device 210 users to communicate with a relatively distant base station 240. The distant base station can be used by the user's cellular signal provider. However, another base station 230, operated by a different cellular signal provider, which is operating in the same frequency band, may be located relatively close to the signal booster 220. Downlink signals from the relatively close base station 230 will have a much higher RSSI (lower BSCL) at the signal booster 220 than the DL signals from the relatively far base station 240. The RSSI or BSCL measurements of the combined DL signals from the relatively close 230 and relatively far base stations 240 will result in significantly reduced UL gain and/or noise power settings for the UL signals transmitted from the signal booster 220 for a user of the relatively far base station 240. If the RSSI of the DL signals from the close base station 230 are sufficiently high, it can result in the gain and/or noise power of the transmitted UL signal being set sufficiently low that the UL signal cannot be accurately received at the relatively far base station 240.

Signal boosters, such as signal booster 220, also typically provide amplification of UL signals over a fairly broad spectrum relative to a UE or MS. For example, a signal booster may provide amplification of an UL signal over an entire 3GPP LTE band. The broadband amplification of the band, and not just a single signal, results in an amplification of all of the noise in the band as well. The amplification of the noise effectively raises the noise floor for a receiver, such as a base station. In order to ameliorate the effects of increasing the noise floor, the Federal Communication Commission (FCC) in the United States has issued an order, in FCC Report and Order 13-21, that sets threshold levels for uplink gain and noise levels.

In FCC Report and Order 31-21, the transmitted noise power in dBm/MHz of consumer boosters at their uplink and downlink ports shall not exceed −103 dBm/MHz—RSSI. Where RSSI (received signal strength indication) is the downlink composite received signal power in dBm at the booster donor port for all base stations in the band of operation. RSSI is expressed in negative dB units relative to 1 mW. (2) The transmitted maximum noise power in dBm/MHz of consumer boosters at their uplink and downlink ports shall not exceed the following limits: (i) Fixed booster maximum noise power shall not exceed −102.5 dBm/MHz+ 20 Log 10 (Frequency), where Frequency is the uplink mid-band frequency of the supported spectrum bands in MHz. (ii) Mobile booster maximum noise power shall not exceed—59 dBm/MHz.

Similarly, FCC Report and Order 31-21 limits the uplink gain in dB of a consumer booster referenced to its input and output ports such that it shall not exceed −34 dB—RSSI+ MSCL, where RSSI is the downlink composite received signal power in dBm at the booster donor port for all base stations in the band of operation. RSSI is expressed in negative dB units relative to 1 mW. MSCL (Mobile Station Coupling Loss) is the minimum coupling loss in dB between the wireless device and input port of the consumer booster. MSCL is to be calculated or measured for each band of operation and provided in compliance test reports.

In accordance with one embodiment, a signal booster can be configured to channelize a DL signal received at the signal booster in a selected band. Channelize, as used herein, can include filtering a selected band to pass portions of the band, or block portions of the band, to reduce the RSSI (or increase the BSCL) of one or more DL signals that cause an undesirable reduction in UL gain and/or noise power of an uplink signal for a user of the signal booster. An undesirable reduction in the UL gain and/or noise power is a reduction in the UL gain and/or noise power of the UL signal transmitted by the signal booster for the user, wherein the reduction in UL gain and/or noise power is used to protect the network (i.e. base stations) when no additional protection is actually necessary. For example, a DL signal received from a close BS may result in a relatively high RSSI. However, the booster may be boosting an UL signal for transmission to a distant BS relative to the close BS. Removing, or substantially attenuating the signal from the close BS can result in an undesirable reduction in the UL gain, while not actually protecting the distant BS since a higher power UL gain can be used to transmit to the distant BS while staying within the parameters of the FCC.

While the FCC requirements are used as an example, they are not intended to be limiting. Other governmental or industry standards may also designate limits or suggestions for UL signal gain limitations for a signal booster. By more accurately measuring DL signals, the UL signal gain can be maximized relative to the governmental or industry limits or suggestions.

Channelizing the DL and UL signals in selected bands at the signal booster can reduce interference from other DL signals from a same base station or different base stations and allow more accurate measurements of BSCL for a selected user, thereby enabling the UL signals transmitted from the signal booster for the selected user to have an increased gain and increase the range over which the selected user can communicate. In addition, channelizing the UL signal can allow filtering that will reduce the noise power transmitted to base stations and allow the signal booster to meet the specification requirements. Filtering of the UL signal can typically occur at an equivalent location (i.e. channel) as is filtered in the DL signal. For example, in an FDD band, such as 3GPP LTE band 5, if the bottom 15 MHz of the DL spectrum for 3GPP LTE band 5 is filtered to attenuate signals in those frequencies, the bottom 15 MHz of the UL spectrum for 3GPP LTE band 5 can also be similarly filtered. By filtering the UL signal, the noise floor can be effectively reduced, thereby enabling a base station, such as a 3GPP LTE eNodeB, to receive the UL signal with a lower noise floor.

FIG. 3 illustrates several example embodiments that can be used to channelize a downlink signal of a signal booster. In FIG. 3a, a channelization device 330 can be configured to receive a cellular downlink signal from an outside antenna 310, filter the downlink signal to provide a channelized downlink signal, and output the channelized downlink signal to a signal booster 320. The channelization device 330 can be passive or active. A passive channelization device can passively filter the downlink signal for communication to a signal booster 320.

The signal booster 320 can receive an uplink signal via the inside antenna 312. If the RSSI value of the downlink signal is greater than a threshold value, which would require a reduction in gain and/or noise power of the uplink signal, then the signal booster can use the channelized downlink signal, or information regarding the channelized downlink signal, to reduce the RSSI value of the downlink signal and increase a gain and/or noise power of an uplink signal. The uplink signal can then be communicated to the base station using the outside antenna 310. An active channelization device 330 can be configured to amplify uplink and/or downlink signals to compensate for any signal loss caused by the channelization device 330. Additional details of the channelization device are discussed in more detail in the proceeding paragraphs.

An example of a channelized signal booster 340 is illustrated in FIG. 3b. The channelized signal booster 340 can comprise the functions of the channelization device 330 integrated into the signal booster 320 to provide a signal booster that is configured to channelize a downlink signal to enable one or more channels to be filtered, or have a component of a BSCL value of the one or more channels removed from the overall BSCL value, as previously discussed. Additional active solutions can include the channelization and filtering of intermediate frequency (IF) signals associated with a received downlink signal, and the use of digital signal processing (DSP) to digitally filter the downlink signal. In addition, the outside antenna 310 can be actively tuned to reduce the contribution of undesired signals to the BSCL value of the downlink signal. These concepts will be described more fully in the proceeding paragraphs. FIG. 3c illustrates an example of a signal booster 320 with an active channelized inline box 350.

In another embodiment, the BSCL at the signal booster can be estimated in other ways than using RSSI. For example, signal attenuation through the Earth's atmosphere can be calculated based on the distance the signal travels. Accordingly, a distance from a signal booster to one or more base stations can be estimated. A BSCL value can then be calculated based on the estimated distance. The gain and/or noise power of an uplink signal of the signal booster can then be adjusted, if necessary. For example, if the BSCL value is less than a threshold value, the gain and/or noise power can be adjusted.

The downlink signal received at the signal booster can be in in one or more frequency bands. For example, the downlink signal can be located in 3GPP LTE FDD bands 1-32 or TDD bands 33-44 based on the country or region in which the signal booster is used. In the United States, the downlink signal can be located in 3GPP LTE bands 2, 4, 5, 12, 13, 17 or 25.

In one embodiment, the distance can be calculated from the signal booster to the one or more base stations using a geographic coordinate system location of the signal booster and the one or more base stations. In another embodiment, the distance from the signal booster to the one or more base stations can also be estimated using a pilot signal timing. In another embodiment, the distance from the signal booster to the one or more base stations can be estimated based on the pilot signal timing and a difference in the geographic coordinate system location of the signal booster and the one or more base stations. In one example, the geographic coordinate system location of the signal booster and/or base stations can be estimated using a global positioning satellite (GPS) system.

After estimating the distance between the signal booster and the one or more base stations, a signal loss over that distance can be calculated. The amount of signal loss that occurs in Earth's atmosphere is dependent on the frequency of the signal. In addition, the type of terrain at which the signal booster and one or more base stations are located can significantly affect the amount of signal loss. Different signal loss terrain models may be used depending on the terrain type. The type of terrain can determine how much the signal is absorbed and/or reflected by different types of geographic and/or manmade features. Models can be designed or used to account for different amounts of absorption and reflection that may occur between the signal booster and the one or more base stations. For example, the signal loss terrain model may be modeled for one or more of a country terrain, a flat terrain, a hilly terrain, a suburb terrain, a city terrain, a mountain terrain, a forest terrain, and a line of site terrain, and so forth.

In another embodiment, the BSCL contribution of one or more channels in a selected band of a downlink signal can be removed based on a location of a base station relative to the signal booster. As previously discussed, signal boosters are typically configured to communicate with a relatively distant base station. Different base stations often communicate in different frequency channels within a selected frequency band. Channelization filtering can be used to identify different downlink signals based on the channel (i.e. frequency) at which the downlink signals are communicated. It can be assumed that downlink signals associated with selected frequency channels in a band are communicated from a base station with a known geographic coordinate. Alternatively, based on the RSSI or BSCL of a selected channel, the location of the base station can be estimated. For instance, downlink channels with a relatively high RSSI power level can be assumed to be associated with a relatively close base station. Conversely, downlink channels with a relatively low RSSI power level can be assumed to be associated with a relatively distant base station.

In one example, a signal booster can be employed by a business or homeowner that only uses wireless service provider A. The location of the base station for wireless service provider A can be relatively distant to the signal booster. Downlink signals from the relatively distant base station can be communicated in channel A of a selected band. In addition, downlink signals transmitted by cellular service provider B can be received at the signal booster on channel B of the selected band from a relatively close base station. It can be determined that none of the users of the business or homeowner use the signal booster to communicate on channel B to wireless service provider B. Accordingly, the BSCL of the downlink signals transmitted on channel B from the relatively close base station can be discounted. The contribution of the downlink channel B signals can be removed from a broadband RSSI measurement of the selected channel. Alternatively, a narrowband measurement can be performed that does not include the downlink signals on channel B in the selected band. This can significantly reduce the RSSI measurements (or increase the BSCL measurement) and enable uplink signals communicated on channel A to have an increased gain and/or noise power level for communication to the relatively distant base station when the BSCL value for the channel A is less than a threshold value.

In another embodiment, a downlink signal can be measured at a plurality of channels for a selected band to determine a base station coupling loss (BSCL) for the plurality of channels. In one embodiment, signals in the plurality of channels can be measured using a comb filter to add delayed versions of each signal to accommodate for reflections and refractions of the signals as they travel between the base station and the signal booster. The RSSI measurement of the combined signals in the comb filter can enable a more accurate BSCL value to be determined for each of the plurality of channels.

A base station can then be associated with each of the plurality of channels, based on the frequency of each channel (i.e. a base station may transmit at a known frequency), or the BSCL of each channel (i.e. a lower BSCL infers a closer base station to the signal booster, and vice versa) and an estimated distance of each base station. A BSCL value for each channel of the plurality of channels associated with a base station can be disregarded when a user is not communicating with the base station. The BSCL value may be determined by only accounting for downlink signals transmitted from base stations that are used by one or more users of the signal booster.

Alternatively, a broadband measurement for a selected band can be made to estimate BSCL, and the contributions of the BSCL made by channels received from base stations for which users of the cellular signal booster do not use can be subtracted from the total BSCL value. The gain and/or noise power of an uplink signal can then be adjusted if the BSCL value is less than a threshold value. In one embodiment, the gain and/or noise power of the uplink signal of the signal booster can be adjusted based on a lowest BSCL value of a station to which one or more users are communicating.

Figure 4:
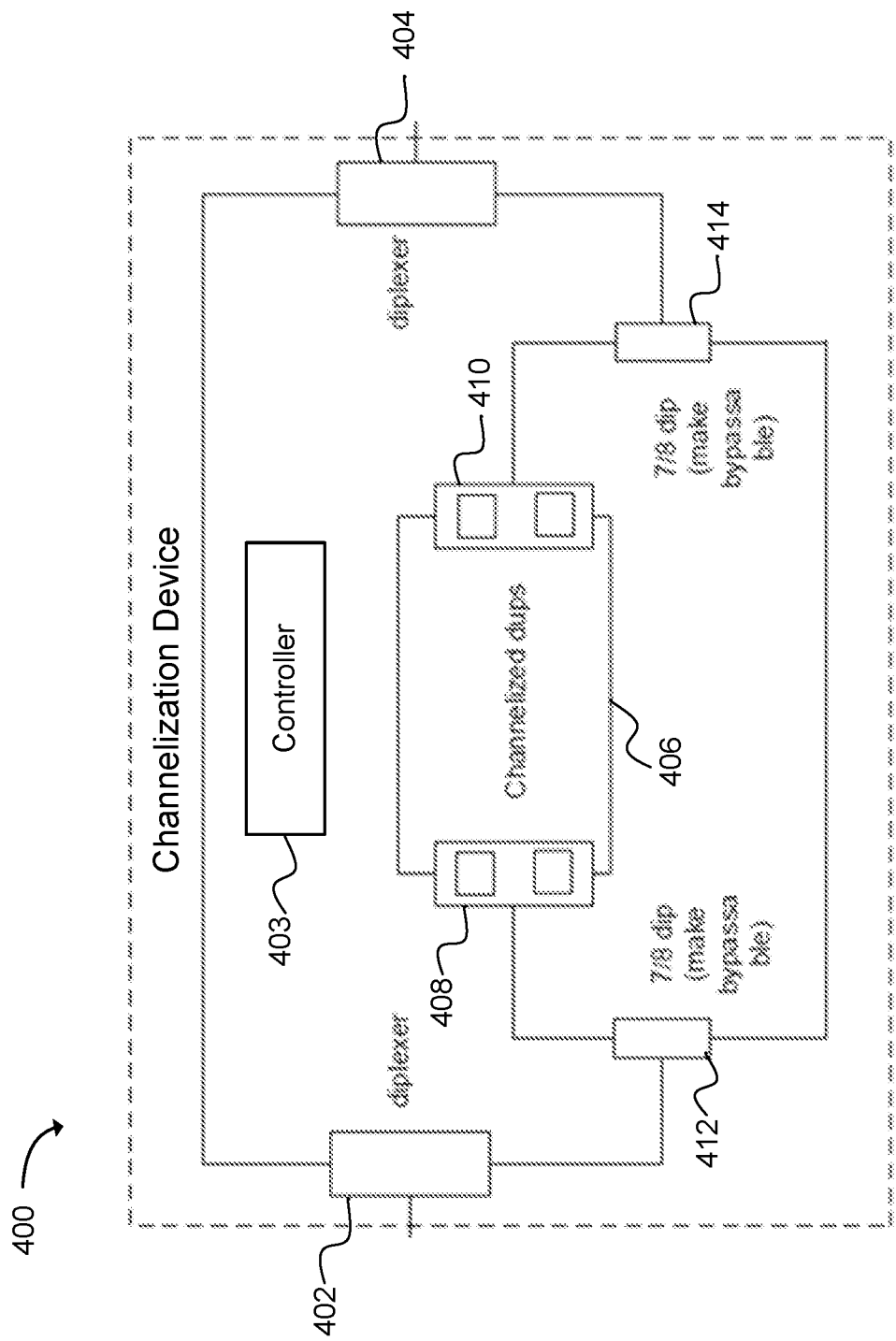
FIG. 4 illustrates a channelized box in accordance with an example.

FIG. 4 provides one example of a channelization device 400 for increasing signal booster gain at a signal booster. The channelization device 400 comprises a first diplexer 402 configured to be coupled to a first interface port and a second diplexer 404 configured to be coupled to a second interface port. In one embodiment, the first interface port can be an outside antenna, such as outside antenna 310, and the second interface port can be an inside antenna, such as inside antenna 312. The channelization device 400 can include radio frequency connections to enable the channelization device 400 to be connected to the first and/or second interface ports, or other components such as a signal booster, as illustrated in FIG. 3a and FIG. 3c.

The channelization device 400 can further comprise a controller 403 that is configured to receive a gain reduction level of an uplink signal from the signal booster (i.e. 320) that is caused by a base station coupling loss value of the downlink signal. The controller 406 can be configured to measure a channelized base station coupling loss (BSCL) value for one or more channels in a channelized downlink signal and communicate the channelized BSCL value to the signal booster 320 to allow the signal booster to increase the gain and/or noise power based on the channelized BSCL value. Alternatively, the controller can be integrated in the signal booster, such as the channelized signal booster 340 shown in FIG. 3.

The channelization device 400 can further comprise a channelized filter 408. In the example illustrated in FIG. 4, the channelized filter 406 is comprised of a first channelized duplexer 408 and a second channelized duplexer 410. Switches 412, 414 can be used to create a bypass path around the channelized filter 408 to allow an uplink signal or a downlink signal to bypass the channelized filter 406.

Figure 5:
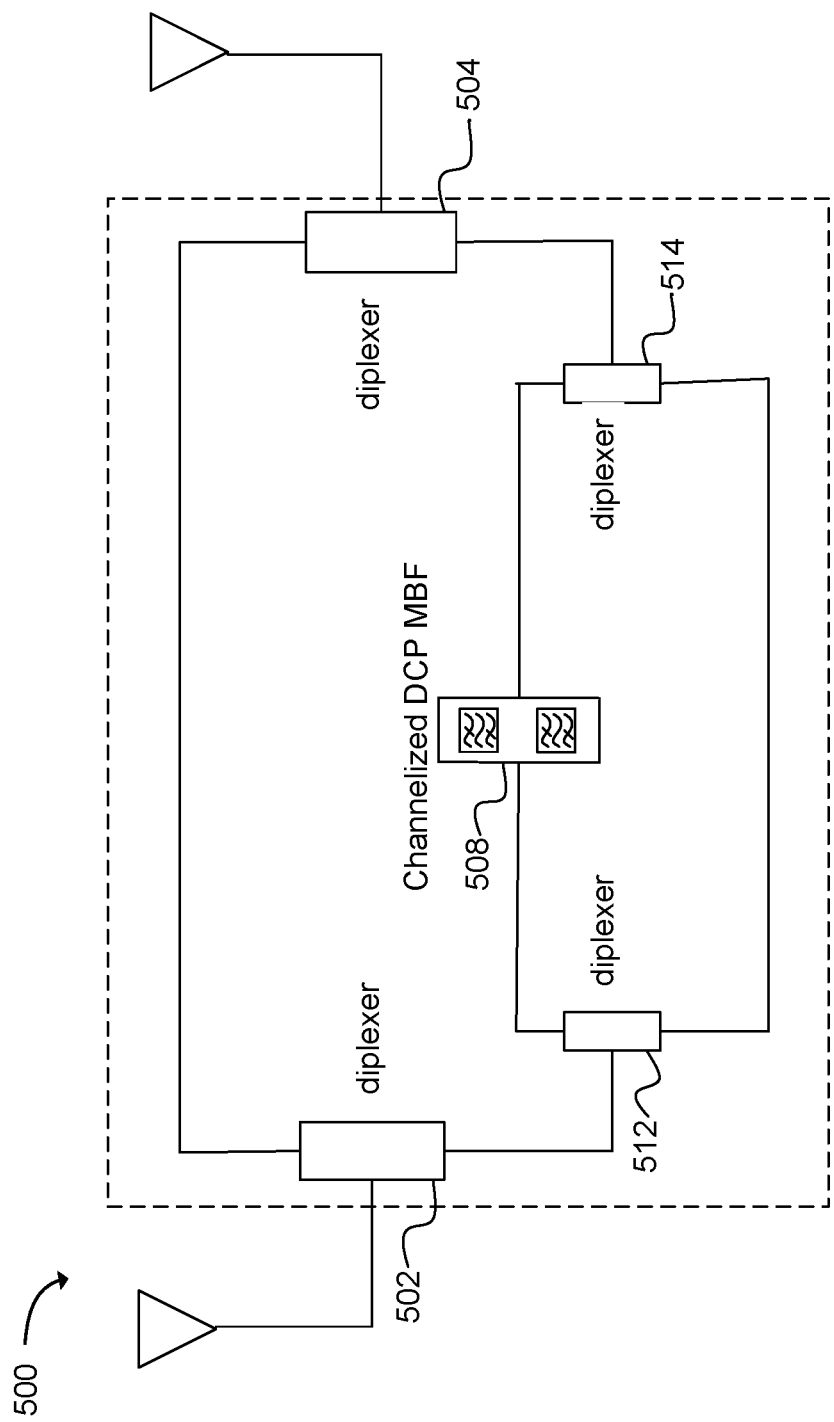
FIG. 5 illustrates a channelized dual-common port (DCP) multi-bandpass filter (MBF) filter in accordance with an example.

FIG. 5 provides another example of a channelization device 500 for increasing signal booster gain at a signal booster. The channelization device 500 comprises a first diplexer 502 that is configured to be coupled to a first interface port and a second diplexer 504 that is configured to be coupled to a second interface port. As in the example of FIG. 4, the channelization device 500 can be configured with radio frequency connectors to enable the channelization device 500 to be connected to the first and second interface ports, or other components such as a signal booster, as illustrated in FIG. 3a and FIG. 3c.

The channelization device 500 further comprises a third diplexer 512 coupled to the first diplexer 502, and a fourth diplexer 514 coupled to the second diplexer 504. A pass-through path is coupled between the third diplexer and the fourth diplexer to allow signals to pass between the first interface port and the second interface port when the BSCL value of the downlink signal is greater than a selected threshold value. A channelized filter 508 is located between the third and fourth diplexers 512, 514.

In one embodiment, the channelized filter can be a dual-common port (DCP) multi-bandpass filter (MBF). The DCP MBF filter 508 can include two or more analog filters, such as bandpass filters (BPF), high pas filters (HPF), or low pass filters (LPF), in a single package. For example, each of the BPFs within the multi-filter package can be configured to pass a selected frequency, such as an uplink band of a selected frequency band, or a downlink band of the selected frequency band. The multi-filter package can have a first common port and a second common port (e.g., on a left and right side of the multi-filter package, respectively). In an example in which the multi-filter package includes two BPFs that are stacked together in a single package, a first common port can have a first signal trace that connects the first common port to an input of a first BPF and an input of a second BPF. Similarly, a second signal trace can connect a second common port to an output of the first BPF and an output of the second BPF. In this example, the two BPFs can be surface acoustic wave (SAW) or bulk-acoustic wave (BAW) filters that are positioned close to each other (e.g., less than 1 millimeter (mm) from each other), and the two BPFs can be designed such that one of the BPFs can have a lower return loss in a selected frequency band (i.e. passband), while the other BPF can have a higher return loss (or poor return loss) on that same frequency band (i.e. stopband). Filters formed using other technologies, such as ceramic filters, may be located farther apart.

In one example, an input signal can have a signal associated with a selected frequency band. For example, a band 1 uplink (UL) signal can include a signal within the 3GPP LTE band 2 UL frequency range. A multi-filter package can include a band 2 UL bandpass filter, configured to pass signals within a frequency range of the band 2UL range, and reject signals outside of this band. The multi-filter package can also include a band 4 UL bandpass filter, configured to pass signals within a frequency range of the 3GPP LTE band 4 UL frequency range, and reject signals outside of this band.

As an example, the multi-filter package can include a B2 UL BPF and a B4 UL BPF. If the signal that enters the multi-filter package is a B2 UL signal, the signal can pass through the B2 UL BPF in the multi-filter package due to the lower return loss that is designed in the B2 UL BPF for the frequency range of the B2 UL signal. Similarly, if the signal that enters the multi-filter package is a B4 UL signal, the signal can pass through the B4 UL BPF in the multi-filter package due to the lower return loss that is designed in the B4 UL BPF for the frequency range of the B4 UL signal. In addition, if the B2 UL signal or the B4 UL signal were to go to the B4 UL BPF or the B2 UL BPF, respectively, the UL signal would get reflected back and would then pass through the appropriate UL BPF.

In one example, the multi-filter package can include electrically short wires or signal traces that connect the first common port and the second common port to the first and second BPFs. In other words, the path from the first common port to the input of the first and second BPFs, and the path from the second common port to the output of the first and second BPFs can be electrically short. In one example, if the wires or signal traces were to become electrically long, the wires or signal traces can create phase and reflection problems. Thus, by keeping the wires or signal traces electrically short, these problems can be avoided and the signal can only travel on an incorrect path for a reduced period of time.

In one example, the electrically short wires or signal traces in the multi-filter package can be shorter than $1/10^{th}$ or $1/20^{th}$ or $1/100^{th}$ of a wavelength of the signal the electrically short wires are carrying. In one example, a 1 GHz wavelength is 300 mm, and the electrically short wires or signal traces can be shorter than 3 mm. Since the wires or signal traces are considerably shorter than the wavelength, an incoming signal can effectively see multiple paths at the same time, and the incoming signal can travel on a path with lower return loss or lower resistance.

In one example, the multi-filter package can include multiple separate bandpass filters, with each bandpass filter configured for a separate frequency band. Each separate frequency band can have a guard band between the frequency band (i.e. the frequency bands are non-adjacent). Each of the bandpass filters can be designed to have an input that is impedance matched to a first common port, and an output that is impedance matched to a second common port.

In another example, it can be difficult for multiple different bandpass filters, each with different passbands, to each be impedance matched to a common port. To overcome that limitation, the multi-filter package can include one or more matching networks. For example, a matching network can be coupled to inputs of two or more BPFs in the multi-filter package. A separate matching network can be coupled to the outputs of two or more BPFs in the multi-filter package. The matching network(s) can each be a separate module that is external to the BPFs, but within the multi-filter package. The matching network(s) can include series inductors and/or shunt capacitors, which can function to impedance match the inputs of the BPFs in the multi-filter package to the first common port and/or impedance match the outputs of the BPFs in the multi-filter package to the second common port. The impedance matching can be between a common port and each individual BPF port. In other words, each BPF can be matched to a common port, and not to other BPFs. The impedance matching provided by the matching network(s) can enable a signal to travel through a BPF on a lower return loss path in the multi-filter package and bypass a BPF on a higher return loss path of the multi-filter package. Depending on the combination of BPFs in the multi-filter package, the matching implementation can be designed accordingly.

In one configuration, two or more sets of BPFs can be packaged together or connected to form a multi-common port multi-filter package (MCP MFP). For example, a first set of BPFs consisting of two or more BPFs can be connected to a second set of BPFs consisting of one or more BPFs. The first set of BPFs can include DL BPFs and the second set of BPFs can include UL BPFs, or vice versa. The multi-filter package can include a first common port that connects to the first and second set of BPFs, a second common port that connects to the first set of BPFs and a third common port that connects to the second set of BPFs. The wires or signal traces that connect the first, second, and third common ports to each BPF in the first and second sets of BPFs, respectively, can be electrically short. In addition, the multi-filter package can include a matching network that is coupled to the first set of BPFs in the multi-filter package and/or a matching network that is coupled to the second set of BPFs in the multi-filter package. The input of each filter in the MCP MFP can be impedance matched to a common port, or impedance matched using a matching network that is coupled to a common port.

As an example, the multi-filter package can include a first set of BPFs that includes a B2 UL BPF and a B4 UL BPF, as well as a second set of BPFs that includes a B2 DL BPF and a B4 DL BPF. Due to the matching network(s) and the electrically short wires or signal traces, a signal that enters the multi-filter package can pass through an appropriate BPF and bypass the other BPFs in the multi-filter package. For example, an UL signal will pass through one of the UL BPFs with a passband within the signal's band, and bypass the DL BPFs. Similarly, a DL signal will pass through one of the DL BPFs associated with the signal's band, and bypass the UL BPFs. Furthermore, due to the use of matching network(s) and the electrically short wires or signal traces, an UL signal can pass through an appropriate UL BPF and bypass other UL BPFs in the multi-filter package, and similarly, a DL signal can pass through an appropriate DL BPF and bypass other DL BPFs in other frequency bands in the multi-filter package.

In the example of FIG. 5, a first bandpass filter can be configured to pass one or more channels in a selected band of a downlink signal. A second bandpass filter can be configured to pass one or more channels in the selected band of an uplink signal.

For example, the DCP MBF 508, using bandpass filters, can be configured to pass channel A and block channel B, where channel B represents downlink signals from a relatively close base station. By filtering the downlink signals in channel B, the BSCL for the selected band can be increased (the RSSI can be decreased). When the BSCL is less than a selected threshold, the filtering can be used to increase the gain and/or noise power of an uplink signal for a signal booster.

In another embodiment, a user can select to pass channel A and block (i.e. filter) channel B, or block channel A and pass channel B using the DCP MBF 508. The determination of which channel to pass can depend on which channel a user of the cellular booster signal is using, and which channel may be causing inaccurate measurements of the BSCL.

In another embodiment, a selected band can be selectively filtered using a plurality of bandpass filters. For example, four filters, each with a bandpass of approximately 15 MHz, can be used to selectively filter a selected band with a bandwidth of approximately 60 MHz. One or more of the bandpass filters can be configured to pass channels operating within the 15 MHz band of the bandpass filter. The selection of the bands that are passed may be selected based upon setup of a channelization device 500. Alternatively, the selection may be actively determined and selected based on which channel(s) a user is communicating on, and which channel(s) are causing interference.

In one embodiment, a channelized bandpass filter can be configured to communicate one or more channels in a selected band to a signal booster. The signal booster can be configured to measure a BSCL value of the one or more channels in the selected band of a downlink signal. The signal booster can then set an uplink gain or a noise power of an uplink signal based on the BSCL value of the one or more channels passed by the channelized bandpass filter.

In another embodiment, the DCP MBF 508 can be configured as a notch filter. A notch filter can be configured to filter an undesired downlink signal, such as a downlink signal from a relatively close base station, as previously discussed. The use of a notch filter can be advantageous for use in a band that includes many channels. The notch filter can be designed with a DCP MBF that comprises two or more bandpass filters configured to filter a selected frequency band, or notch.

In another embodiment, the channelization device 500 can include one or more amplifiers operatively coupled to the channelized filter 508 and configured to set a noise power and/or provide sufficient amplification to the downlink signal to compensate for loss in the channelization device 500. In one embodiment, the amplifiers can be further configured to provide amplification to the downlink signal to compensate for downlink signal loss that occurs between the channelization device and a signal booster, as shown in FIGS. 3a and 3c.

In another embodiment, an active channelization device can be configured to increase signal booster gain while maintaining network protections. The active channelization device can be configured as illustrated in any of FIGS. 3a-3c. The active channelization device can provide a channelization device 330, such as illustrated in FIG. 3a, with approximately 0 dB net gain (or enough gain to set a noise figure). In one embodiment, the active channelization device can be an accessory to a standard, signal booster 120, as illustrated in FIG. 1.

Channelization, using an active channelization device, can be performed only on bands of interest. The bands of interest can include bands that are frequently used, or where a gain or noise power of an UL signal is frequently reduced due to BSCL levels that are skewed by other downlink signals, as previously discussed. In one embodiment, the channelization bands and parameters can be user-selectable.

Attaching the channelization device 330, as shown in FIG. 3a, to an outside antenna 310 side of a signal booster 320 can enable the signal booster to react to a narrower RSSI bandwidth, thereby decreasing a network RSSI sensitivity. An active channelization device can be used to set a noise figure and to obtain more UL output power than a passive channelization device.

In one embodiment, channelization device 330 can be an active channelization device 330. The active channelization device 330 can be configured to communicate with a signal booster 320 to set UL gains and other desired parameters. In one embodiment, an active channelized device can include a controller that is configured to receive a gain reduction level of an uplink signal from the signal booster that is caused by a base station coupling loss value of the downlink signal. The controller can then measure a channelized base station coupling loss (BSCL) value for one or more channels in a channelized downlink signal and communicate the channelized BSCL value to the signal booster to allow the signal booster to increase the gain and/or noise power based on the channelized BSCL value. Alternatively, the active channelization device 330 can amplify the uplink signal based on the channelized BSCL value and the received gain reduction level.

In another embodiment, the active channelized device can be an active channelized inline device 350, as illustrated in FIG. 3c. The active channelized inline device 350 can be located on an inside antenna 312 side of a signal booster 320. The signal booster 320 can reduce gain due to a BSCL measurement that is lower than a selected threshold, as required. The active channelized inline device 350 can be configured to provide sufficient amplification to make up for network protection gain reductions by the signal booster 320.

In one example, the signal booster 320 can communicate, to the active channelized inline device 350, a BSCL level, or other desired measurement such as RSSI, and the amount of gain reduction to the UL signal due to the BSCL level. The active channelized inline device 350 can then provide channelization and amplification to restore the reduced gain, as previously discussed. Additional amplification can also be provided to make up for path loss between the signal booster 320 and the active channelized inline device 350.

In one embodiment, the channelized filter, such as the DCP MBF 508 illustrated in FIG. 5, or another type of channelized filter, can be comprised of intermediate frequency (IF) filters, such as notch filters. The downlink signal can be down converted using a local oscillator (LO) to an intermediate frequency (IF). The IF notch filter can be configured to allow most channels to pass. Notching out a strongest interfering downlink signal can substantially solve most problems of UL amplification loss due to BSCL interference issues.

However, a single IF notch filter may not always achieve desired specification requirements, or have sufficient bandwidth to shift a notch around a selected band. For example, band 2 has a downlink bandwidth of 65 MHz. In one embodiment, a varying IF notch filter design can be used, as illustrated in FIG. 6.

Figure 6:
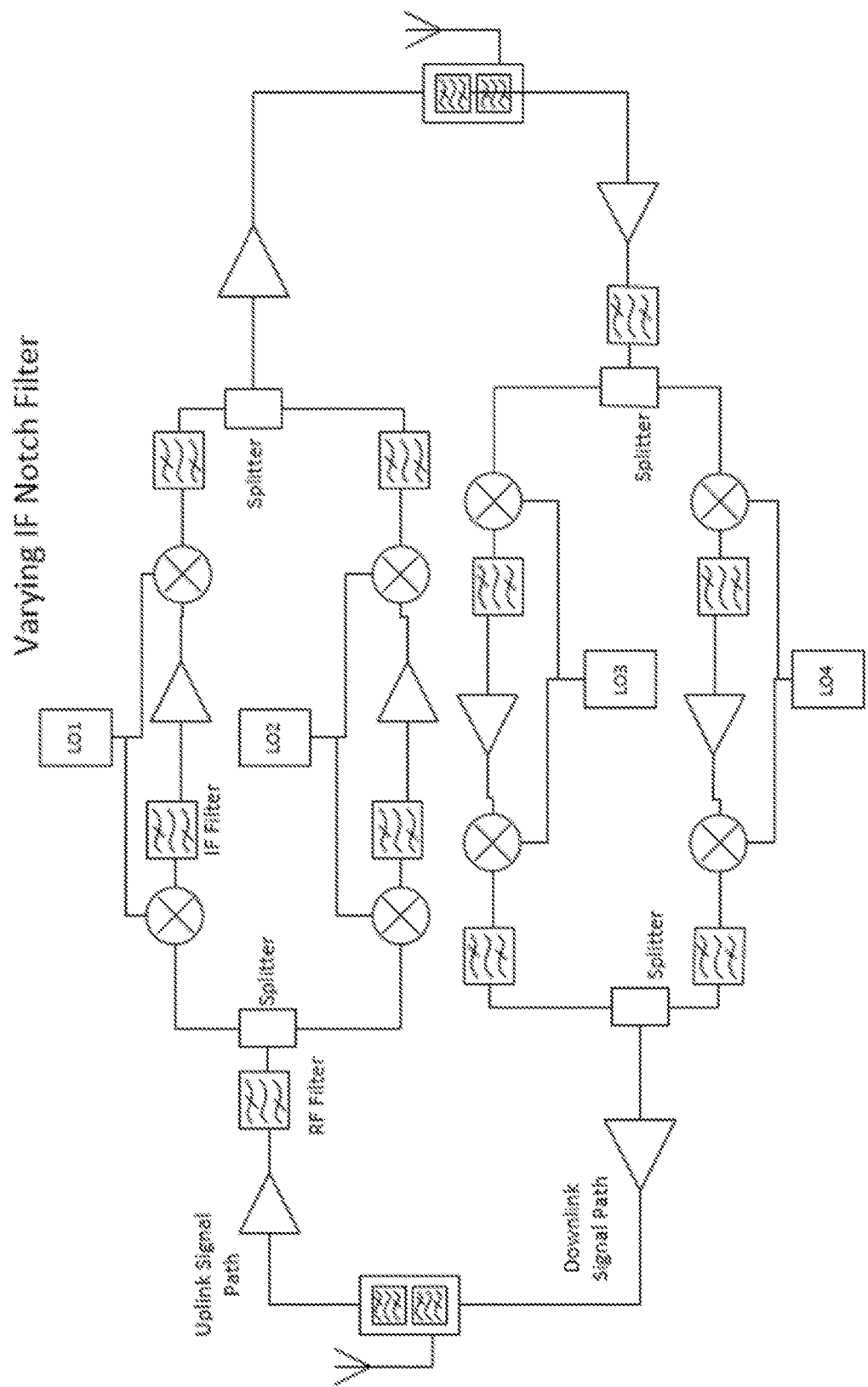
FIG. 6 illustrates a varying intermediate frequency (IF) notch filter for a channelized signal booster in accordance with an example.

In the example of FIG. 6, the IF filters can be designed to have almost as much bandwidth as the RF band does. This enables the booster or user to adjust the width and spectral location of the notch filter. The varying notch filter can be designed to optimize the notch location and minimize the bandwidth of the notch (thereby allowing more channels to pass). In a wideband mode, the signal booster can detect whether it has reduced gain due to DL network protection requirements, as previously discussed. The signal booster can scan the RF band and find the frequency of a selected downlink signal with an amplitude greater than a selected threshold value. The signal booster can set an IF notch over the selected downlink signal and slowly increase the notch width until the booster is no longer in a reduced gain mode. The IF filters can be the same center frequency, or different center frequencies. The frequencies of the local oscillator 1 (LO1) and LO2 can be adjusted to provide a desired notch width. The local oscillators, LO1 and LO2 can be the same as LO3 and LO4 if the downlink IF filter center frequency is shifted.

Figure 7:
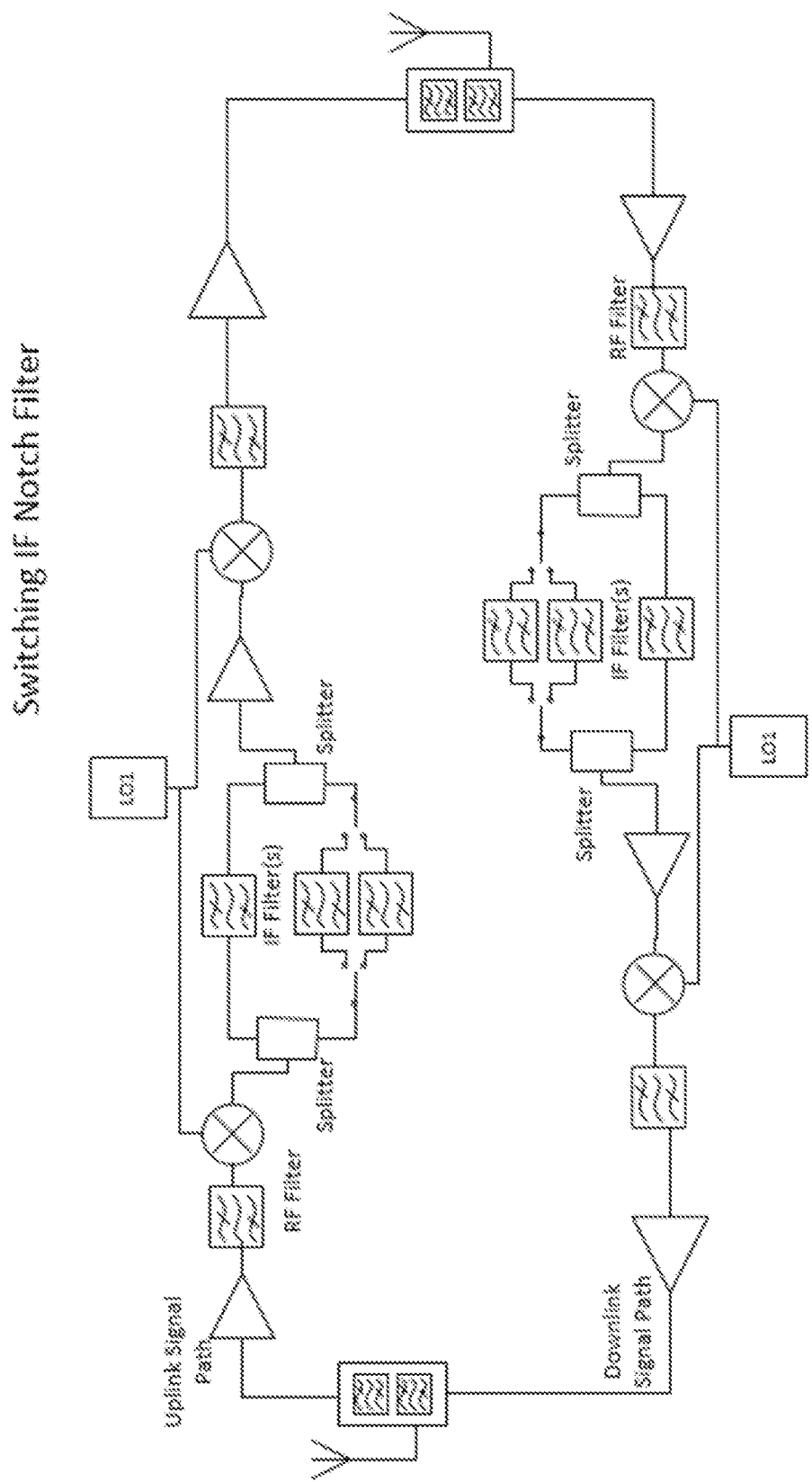
FIG. 7 illustrates a switching IF notch filter for a channelized signal booster in accordance with an example.

FIG. 7 provides an example of a switching IF notch filter. As in the example of FIG. 6, the IF filters can have almost as much bandwidth as the RF band does. The switched IF center frequencies can be offset to create a notch between a main IF filter. This enables the IF signal booster or a user to adjust a width of the IF notch filter, by switching between IF filters, as well as a spectral location of the notch.

To optimize a notch location and minimize its bandwidth, the signal booster can detect, in a wideband mode, whether the signal booster has reduced a gain and/or a noise power of an UL signal due to network protection requirements. The cellular signal amplifier can scan the RF band and find the frequency of a selected channel, such as a channel with an amplitude greater than a selected threshold. The cellular signal amplifier can then set an IF notch filter over the selected channel, with the IF notch filter having a minimum notch width to avoid any gain reduction for network protection.

In one embodiment, LO1 in FIG. 7 can be the same frequency as LO2 if the downlink IF filter center frequency is shifted. The same concept can work without the splitters, but then the notch width cannot be varied. A greater number or fewer number of IF filters can be added to the switched section to allow for more notch widths. The IF filters can be configured in a DCP MBF configuration to remove the splitter if there are no switched IF filters.

The examples of FIG. 6 and FIG. 7 have been described with respect to the embodiment of FIG. 3*b*, in which the channelization filters and amplifiers are integrated into the cellular signal amplifier. However, the varying IF notch filter and the switching IF notch filter can also be designed to operate in the active channelization device 330 or the active channelized inline device 350. In each of these embodiments, the active channelization device 330 or the active channelized inline device 350 can be configured to communicate with the signal booster 320.

In another embodiment, RF channelized filters can be integrated in the signal booster 320. A switch can be used to provide for various channel options. A default option may be wideband (i.e. no channelization). The signal booster can automatically or manually change channels or stay in a wideband mode. In an automated mode, the signal booster can: detect a wideband BSCL value or an RSSI value for a downlink signal; switch in a channelized filter; detect the channelized DL BSCL or RSSI value; repeat for all channelization options; and select the channelization filter option that maximizes performance. The use of RF channelized filter can be superior to that of a passive channelization device since the downlink noise figure and uplink output power can be preserved.

Figure 8:
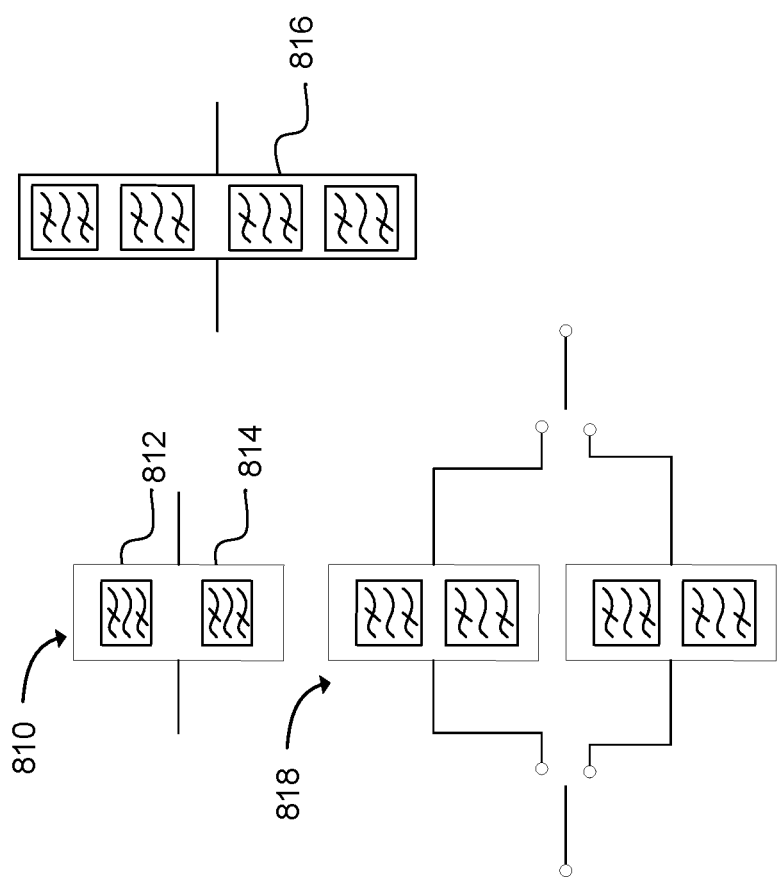
FIG. 8 illustrates a DCP MBF multiband radio frequency (RF) or IF notch filter in accordance with an example.

FIG. 8 provides an example of a DCP MBF multi-band RF or IF notch filter. In this example, an RF notch filter can be implemented by creating a DCP MBF module 810 with two narrowband bandpass filters 812, 814. For example, for an uplink Band 2 notch, one bandpass filter can be configured at 1850-1865 MHz, and the other bandpass filter can be configured at 1880-1910 MHz. This would effectively notch out 1870-1875 MHz. This concept can be used in a passive channelization device by also adding a DL DCP MBF notch bandpass filter, thereby creating four filters in the same DCP MBF package, as shown at 816. The notch filter can be moved around by switching between multiple DCP MBF modules, as shown in 818.

Figure 9A:
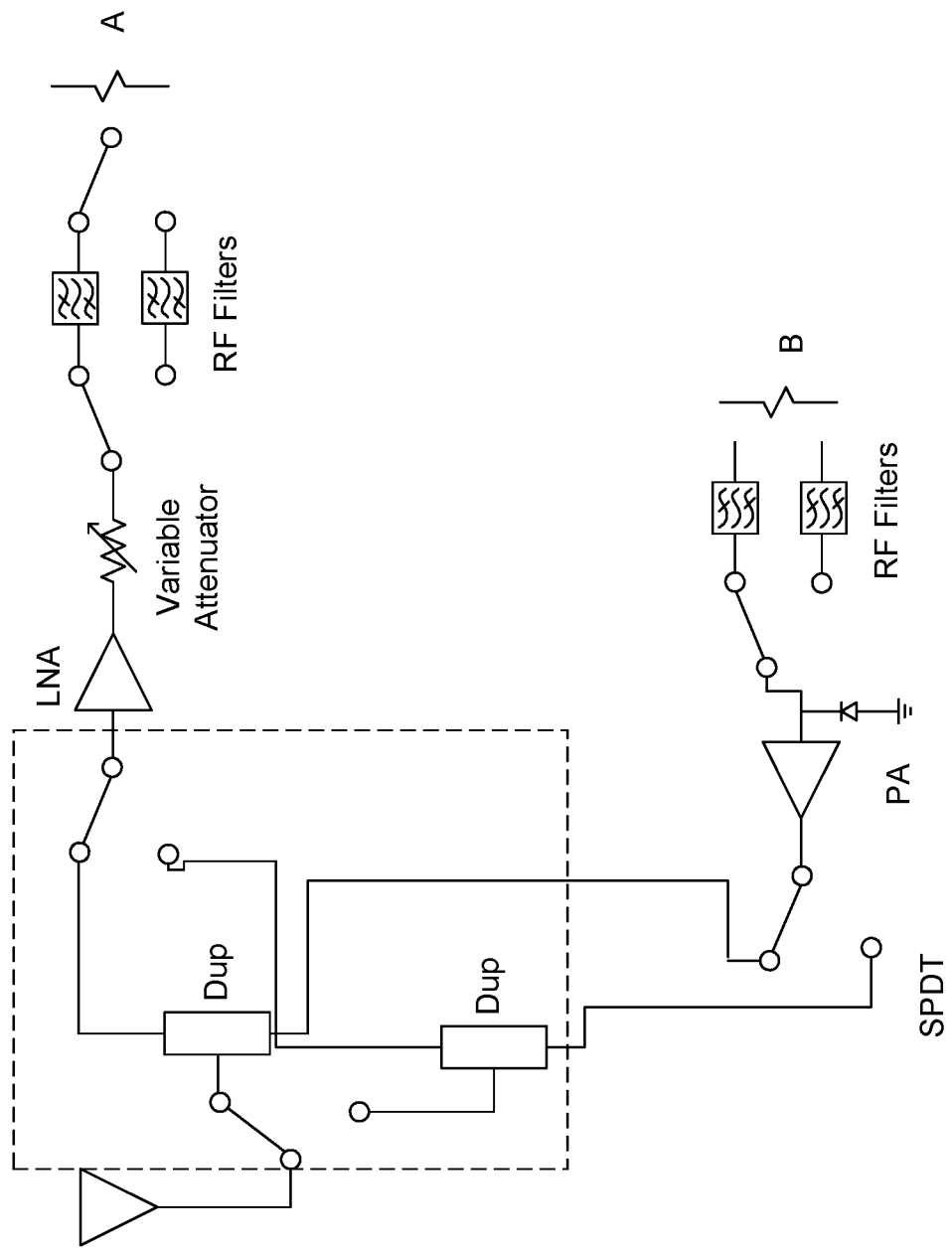
FIGS. 9a-9c illustrates a dual-band, non-simultaneous channelized device in accordance with an example.
Figure 9B:
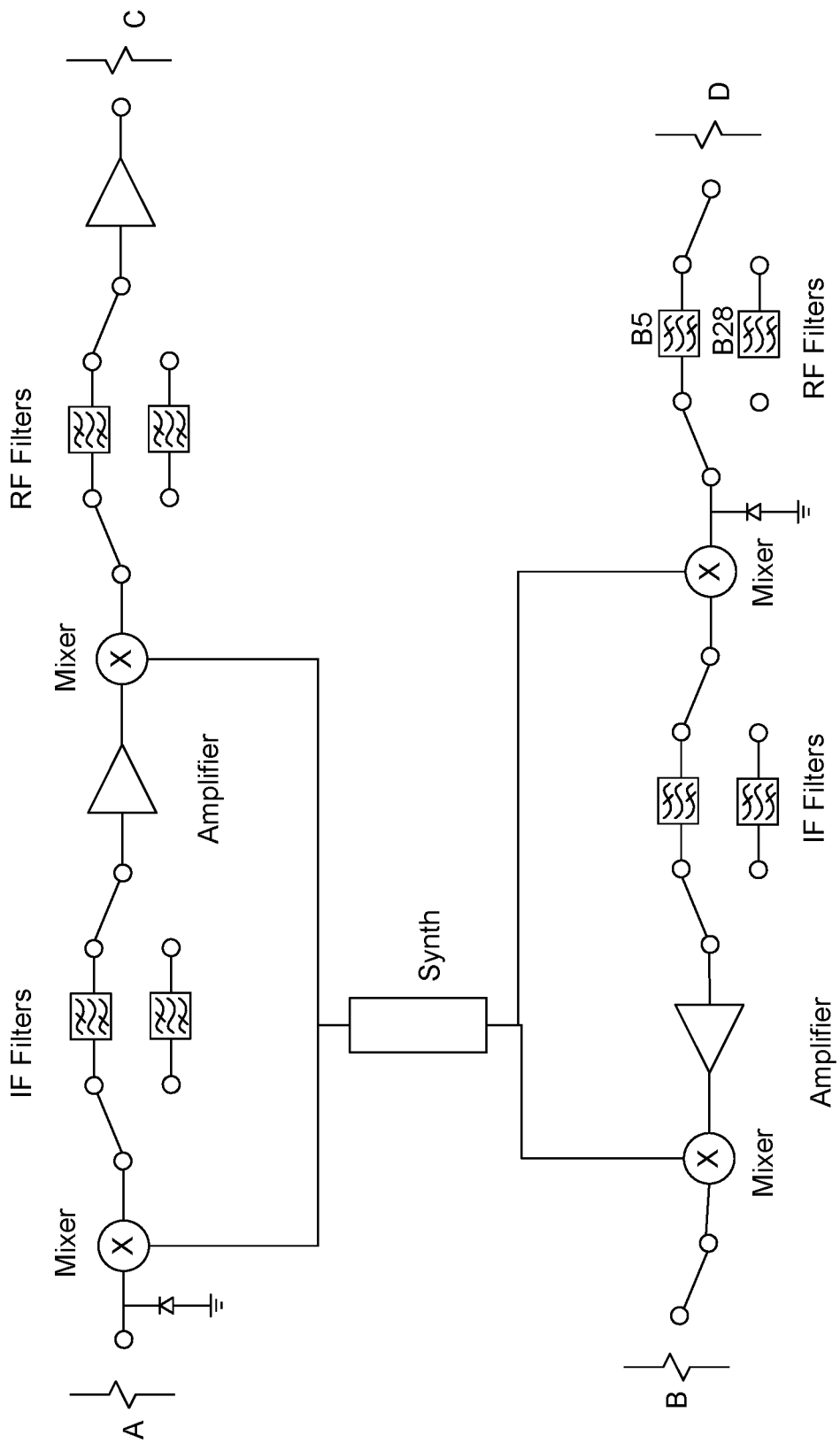
Figure 9C:
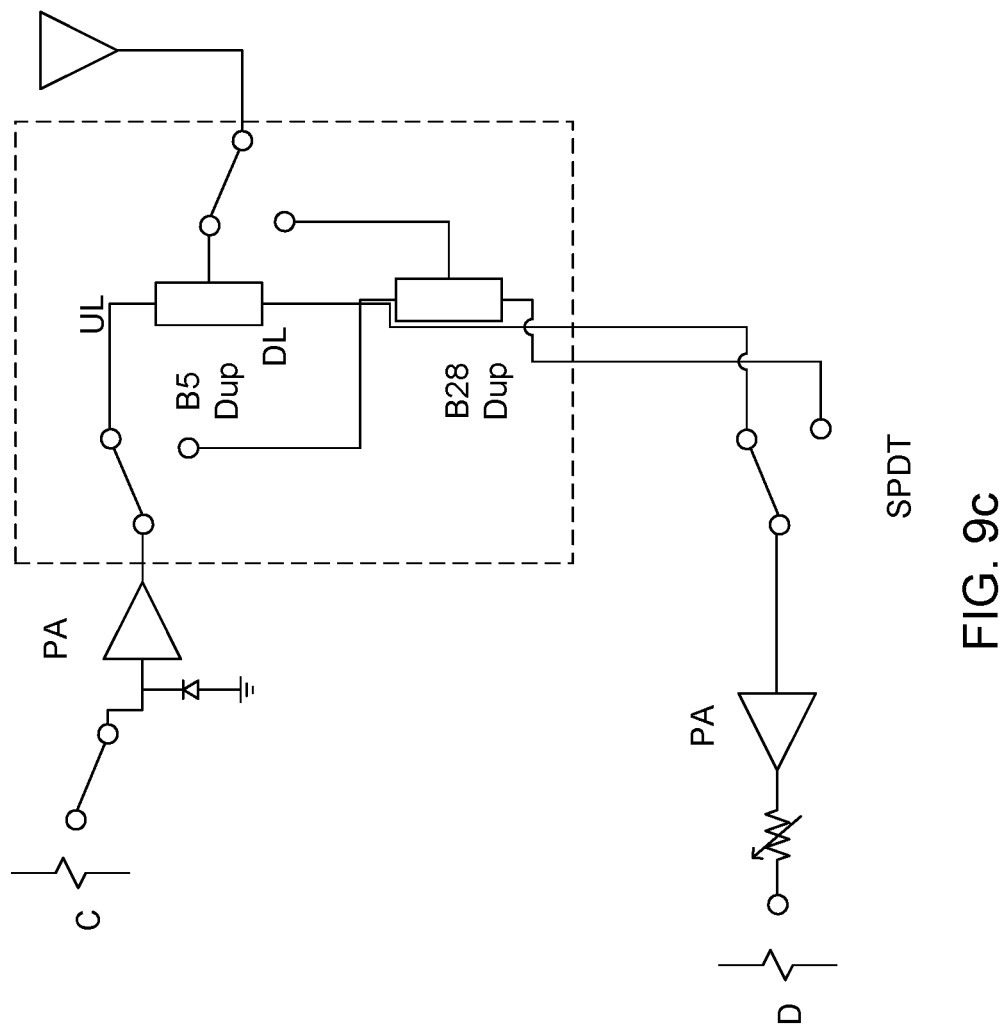

FIGS. 9*a*-9*c* illustrate an example of an active solution. It should be noted that FIGS. 9*a*-9*c* illustrate a single circuit diagram, which has been broken into three sections for purposes of illustration. The sections of the circuit that have been divided are illustrated showing section A and section B in FIG. 9*a*, which adjoin with section A and section B, respectively, in FIG. 9*b*. Similarly, section C and section D in FIG. 9*b* adjoin with section C and section D, respectively, in FIG. 9*c*.

In the example of FIG. 9*a*-9*c*, a dual-band, non-simultaneous channelized device 900 is disclosed. In one example embodiment, the dual-band device can enable channelization of two different bands. The use of a non-simultaneous channelized device can reduce costs by switching in only one band at a time. For example, band 5 and band 28 may both be channelized. The channelized device 900 can switch between channelization of band 5 or band 28. The switching may be performed manually, or may be automated.

For example, in one embodiment, automated switching between two channelized bands may be performed by detecting a wideband downlink received signal strength indicator (RSSI). A channelized filter for a selected band, such as band 5, may then be switched in, and a channelized downlink RSSI can be measured for the selected band. A channelized filter for an additional band, such as band 28, may then be switched in, and a channelized downlink RSSI for the additional band can be measured. The channelized filter that maximizes performance (i.e. wideband (no channelization), channelized B5, or channelized B28) can then be selected. While this example is for bands 5 and 28, it is not intended to be limiting. Any of bands 1-44 may be channelized, as previously discussed. In addition, more than 2 bands may be incorporated in a channelized device.

In the example of FIG. 9*a*-9*c*, the dual band, non-simultaneous channelized device 900 can be integrated into the channelized signal booster 320, the active channelization device 330, or the active inline channelized device 350 of FIG. 3. The dual-band, non-simultaneous channelized device can be configured to allow switching between bands to identify a strongest downlink interfering signal and then provide filtering to reduce an amplitude of the interfering signal. In this example, both UL and DL can be analyzed.

In one example, 20 MHz IF filters can be used for 3GPP LTE Band 5 (B5). Two IF filters can be used to provide a notch filter for 835 MHz to 845 MHz. However, two synthesizers are used to perform this action. The embodiment of FIG. 9 assumes only one IF filter is needed in series. The switching between bands can be accomplished using common microcontroller pins to speed up switching.

Figure 10A:
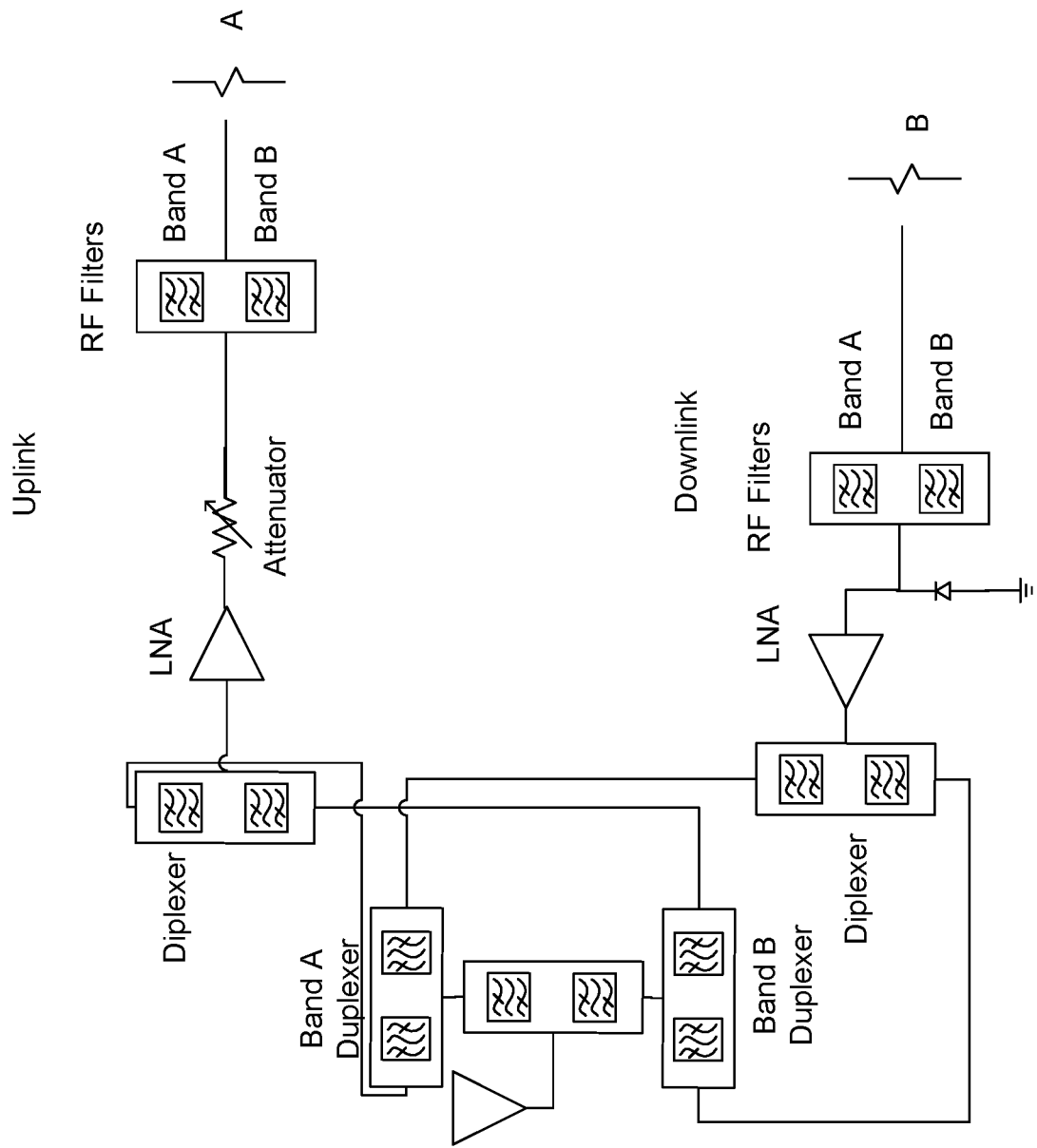
FIGS. 10a-10c illustrates a channelized DCP MBF implementation in accordance with an example.
Figure 10B:
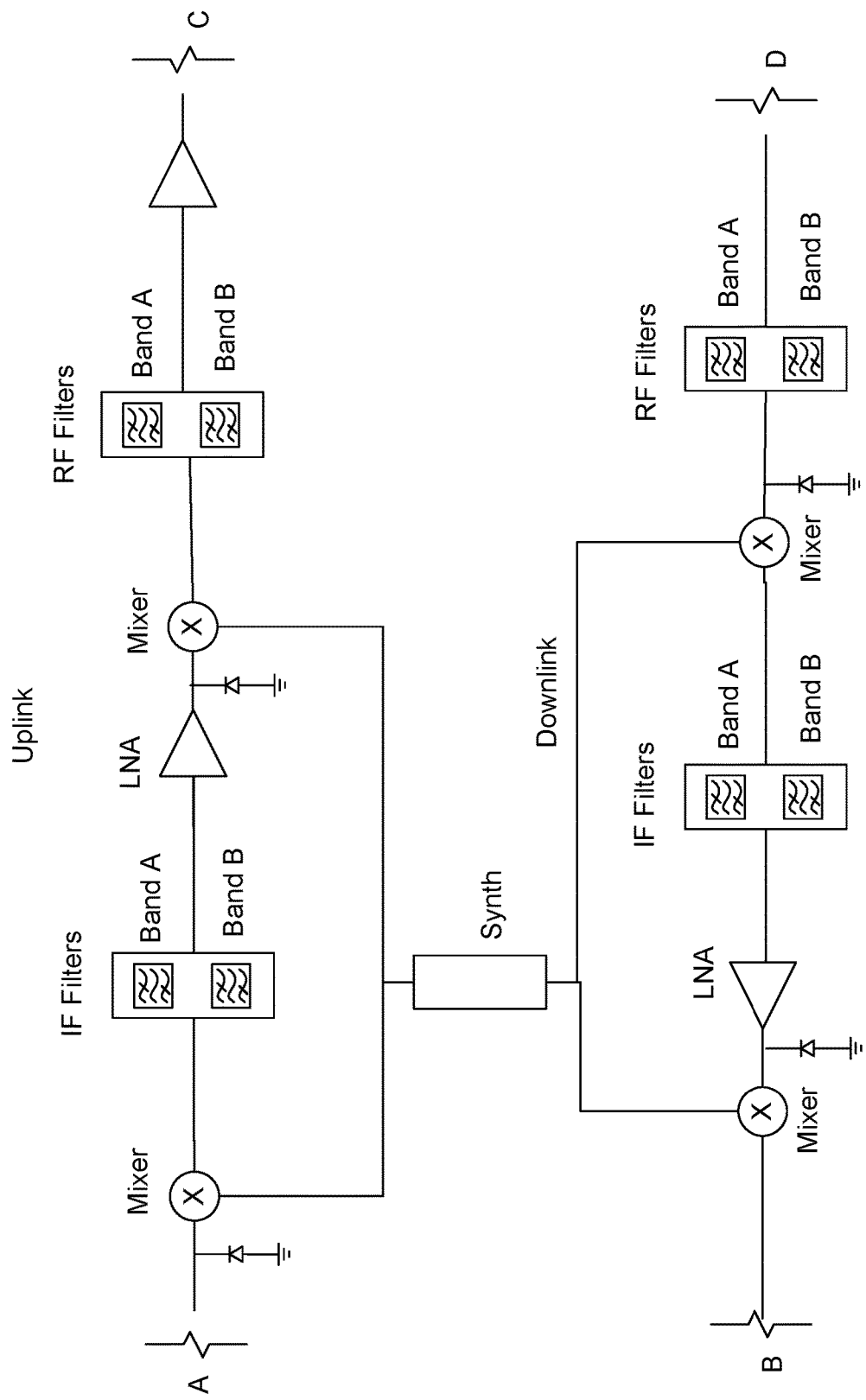
Figure 10C:
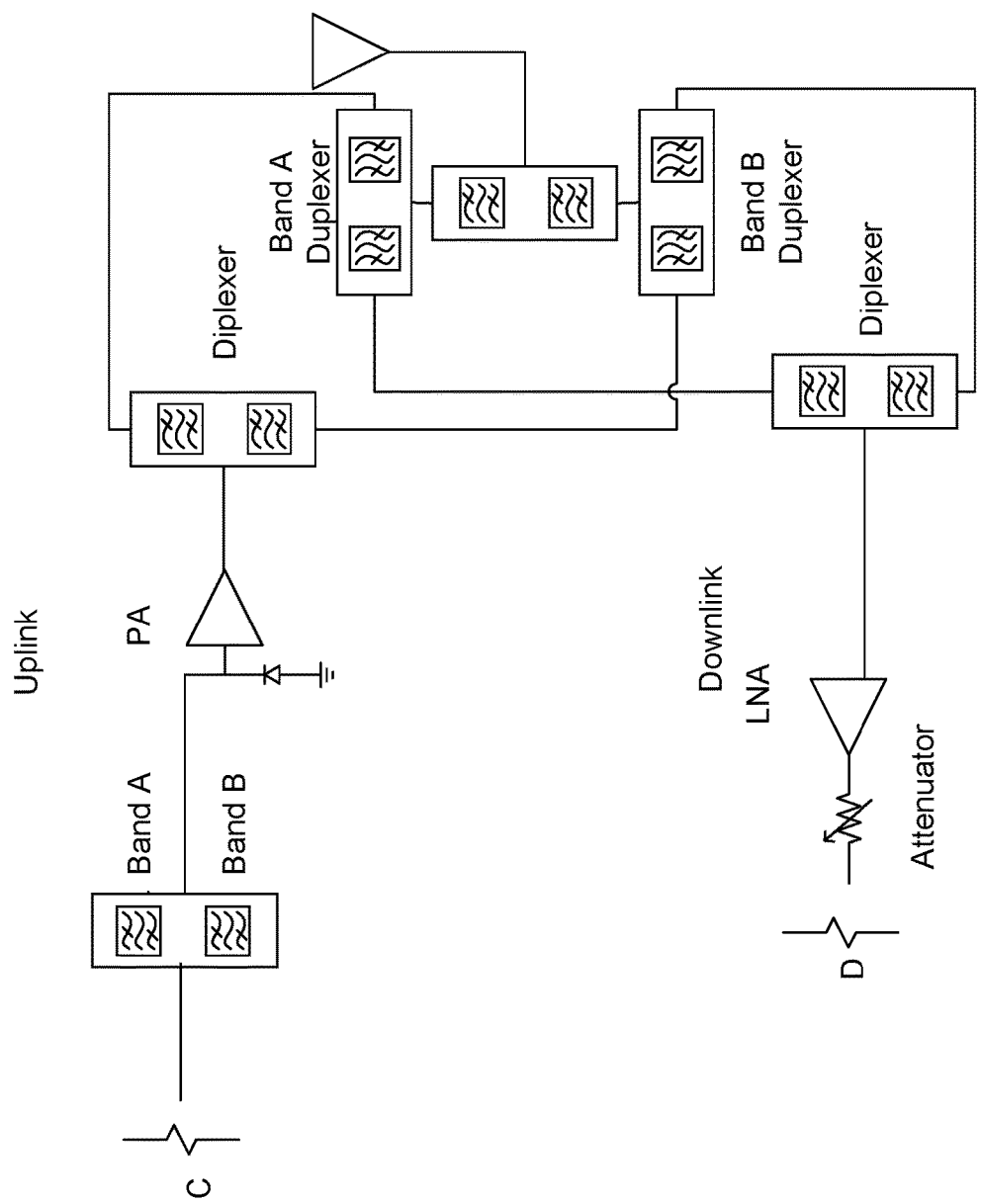

FIGS. 10a-10c illustrates another active solution, comprising a channelized DCP MBF implementation. It should be noted that FIGS. 10a-10c illustrate a single circuit diagram, which has been broken into three sections for purposes of illustration. The sections of the circuit that have been divided are illustrated showing section A and section B in FIG. 10a, which adjoin with section A and section B, respectively, in FIG. 10b. Similarly, section C and section D in FIG. 10b adjoin with section C and section D, respectively, in FIG. 10c.

With the use of a DCP MBF architecture, as illustrated in the example of FIG. 10a-10c, multiple bands can be channelized and operate at the same time. Switching between different bands is not required. DCP MBF band-sharing can be used to significantly reduce the cost of implementation. Synthesizers may be shared since the signals are all in one signal path. DCP MBF IF filters can be used as well. It can be assumed that only one IF filter is needed in series.

In one example, a DCP MBF notch filter for a band, such as 3GPP LTE Band 25, can have the following specifications:

| Parameter | Frequency (MHz) | Units | Spec |
|---|---|---|---|
| Low Band Response | | | |
| Passband#1 Insertion Loss | 1850-1865 | dB | <3 |
| Passband#2 Insertion Loss | 1890-1915 | dB | <3 |
| Passband#1 Return Loss | 1850-1865 | dB | >10 |
| Passband#2 Return Loss | 1890-1915 | dB | >10 |
| Attenuation | 1870-1885 | dB | As much as possible |
| | 1930-1935 | dB | >30 |
| | 1935-1995 | dB | >35 |
| High Band Response | | | |
| Passband#1 Insertion Loss | 1930-1945 | dB | <3 |
| Passband#2 Insertion Loss | 1970-1995 | dB | <3 |
| Passband#1 Return Loss | 1930-1945 | dB | >10 |
| Passband#2 Return Loss | 1970-1995 | dB | >10 |

-continued

| Parameter | Frequency (MHz) | Units | Spec |
|---|---|---|---|
| Attenuation | 1950-1965 | dB | As much as possible |
| | 1910-1915 | dB | >30 |
| | 1850-1910 | dB | >35 |
| Power into either port | | W | >1 |

The notch filter can be configured to substantially filter a selected signal in B25. Similarly, notch filters in other bands can be used to remove selected channels received in the DL signal to decrease the RSSI in the DL signal, thereby allowing the UL signal gain to be increased at the signal booster.

Figure 11A:
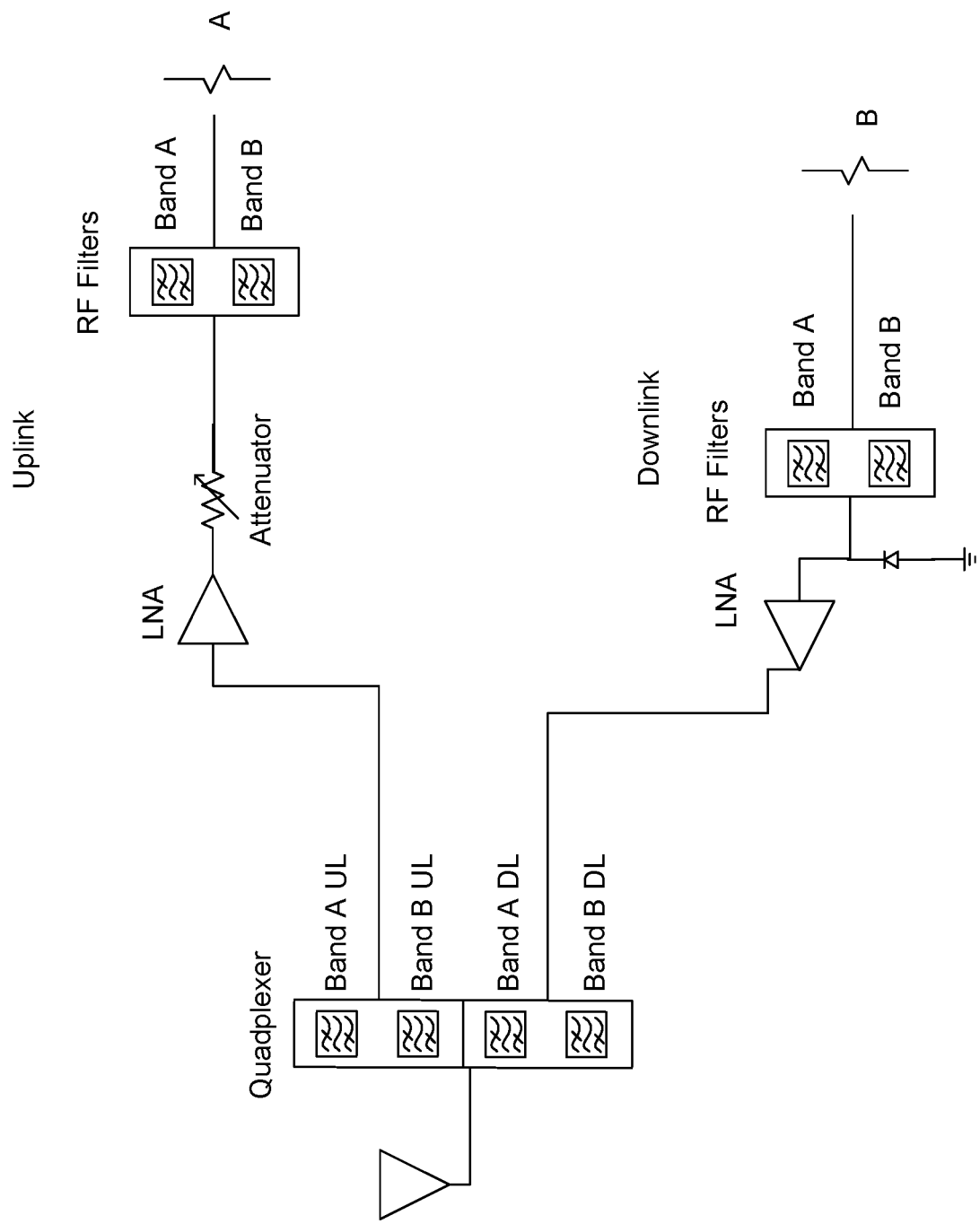
FIGS. 11a-11c illustrates a channelized DCP MBF implementation using a quadplexer in accordance with an example.
Figure 11B:
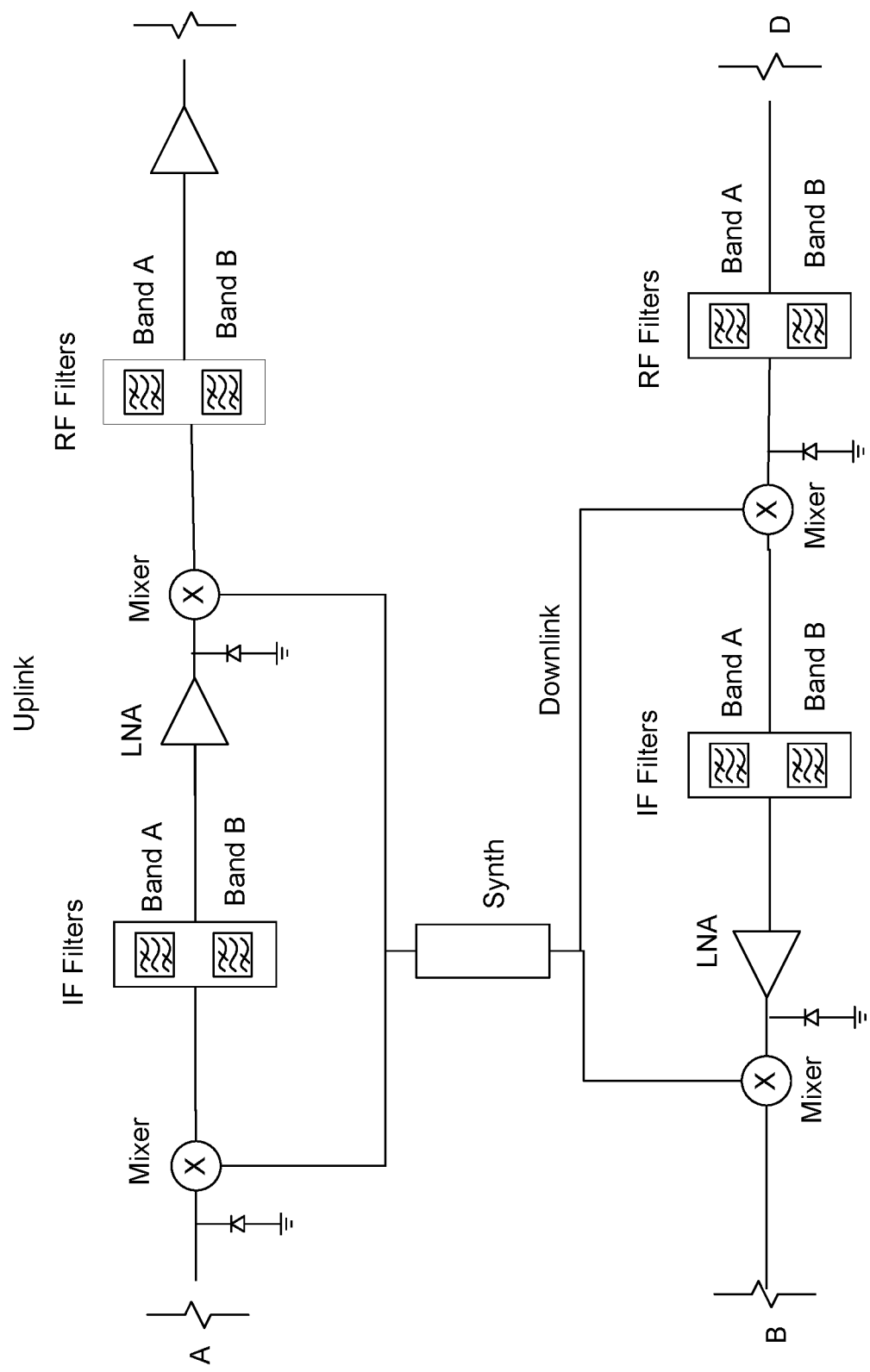
Figure 11C:
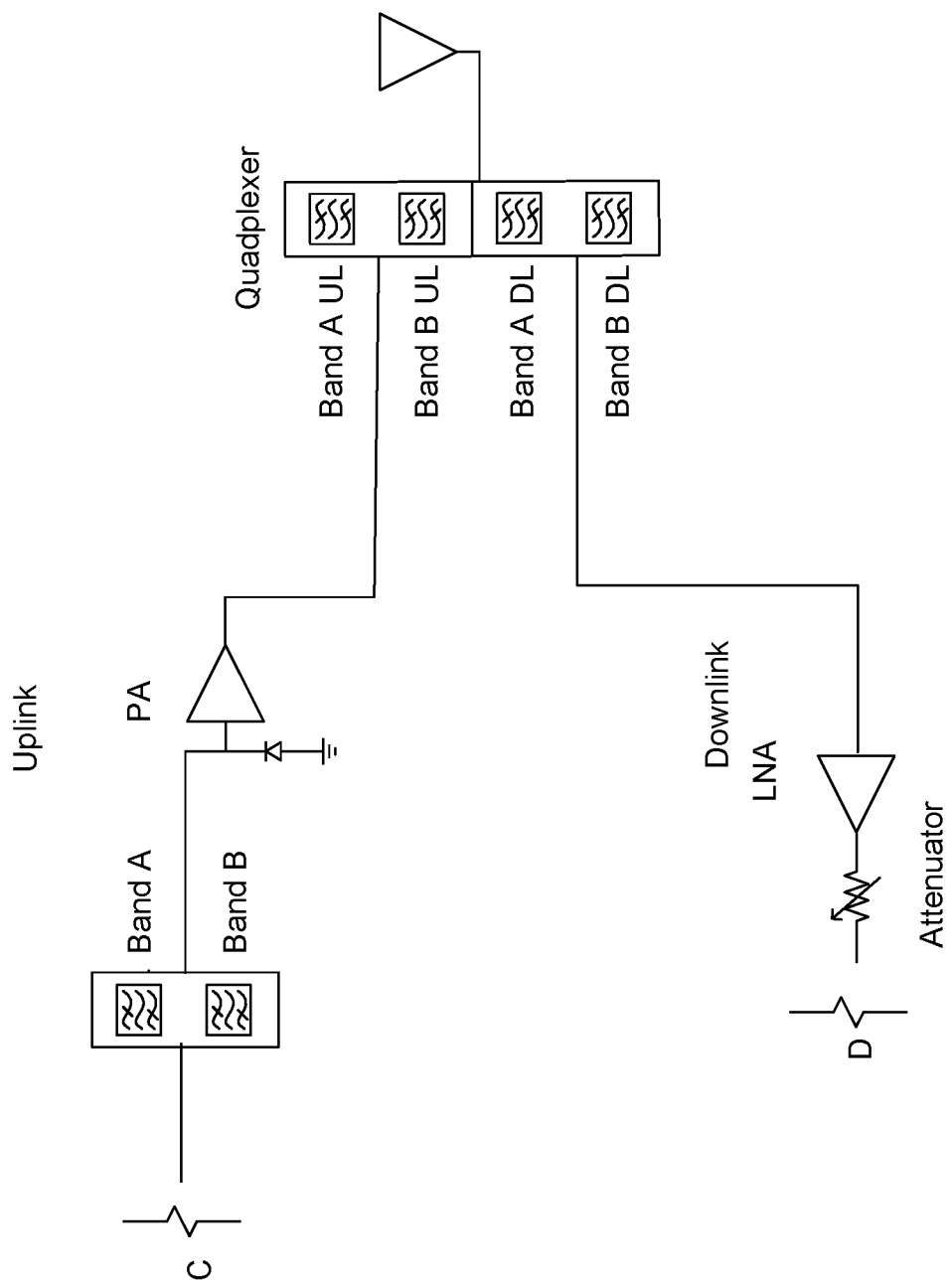

As illustrated in FIGS. 11a-11c, a quadplexer may be used to avoid diplexer losses on the front end. The use of the quadplexer can also increase output power by 3 dB and decrease the noise figure by 3 dB. In one embodiment, diplexers can be used at the bandpass ports to isolate the filters.

In another embodiment, an active channelization device can be implemented using a digital signal processor (DSP) to digitize and channelize the broadband downlink signal and filter selected channels within the downlink signal to optimize gain for each channel based on network protection. In one embodiment, each channel in the band can have a different gain level due to the DSP filter.

Figure 12A:
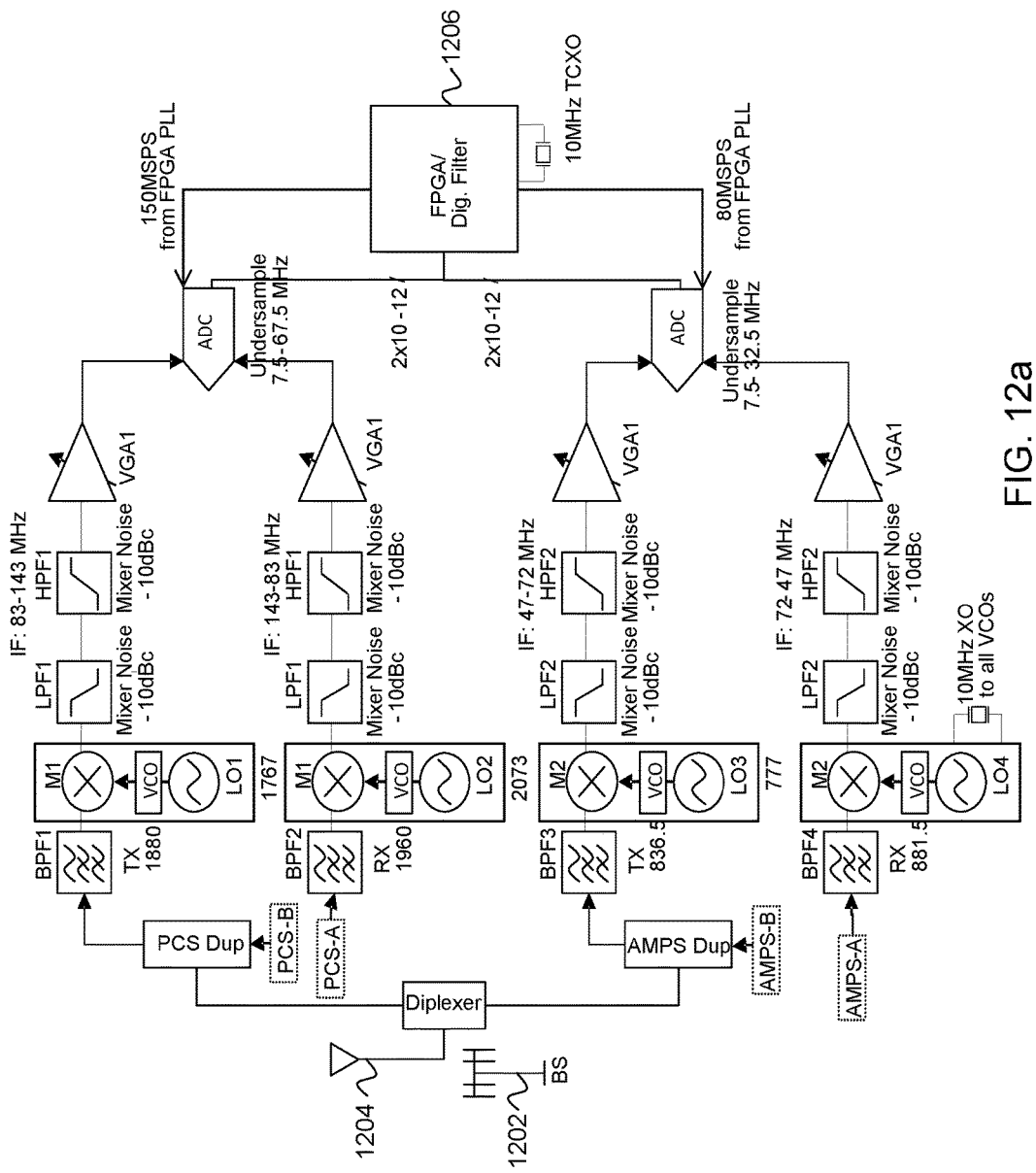
FIGS. 12a and 12b illustrate a channelized digital implementation using a digital signal processor (DSP) in accordance with an example.
Figure 12B:
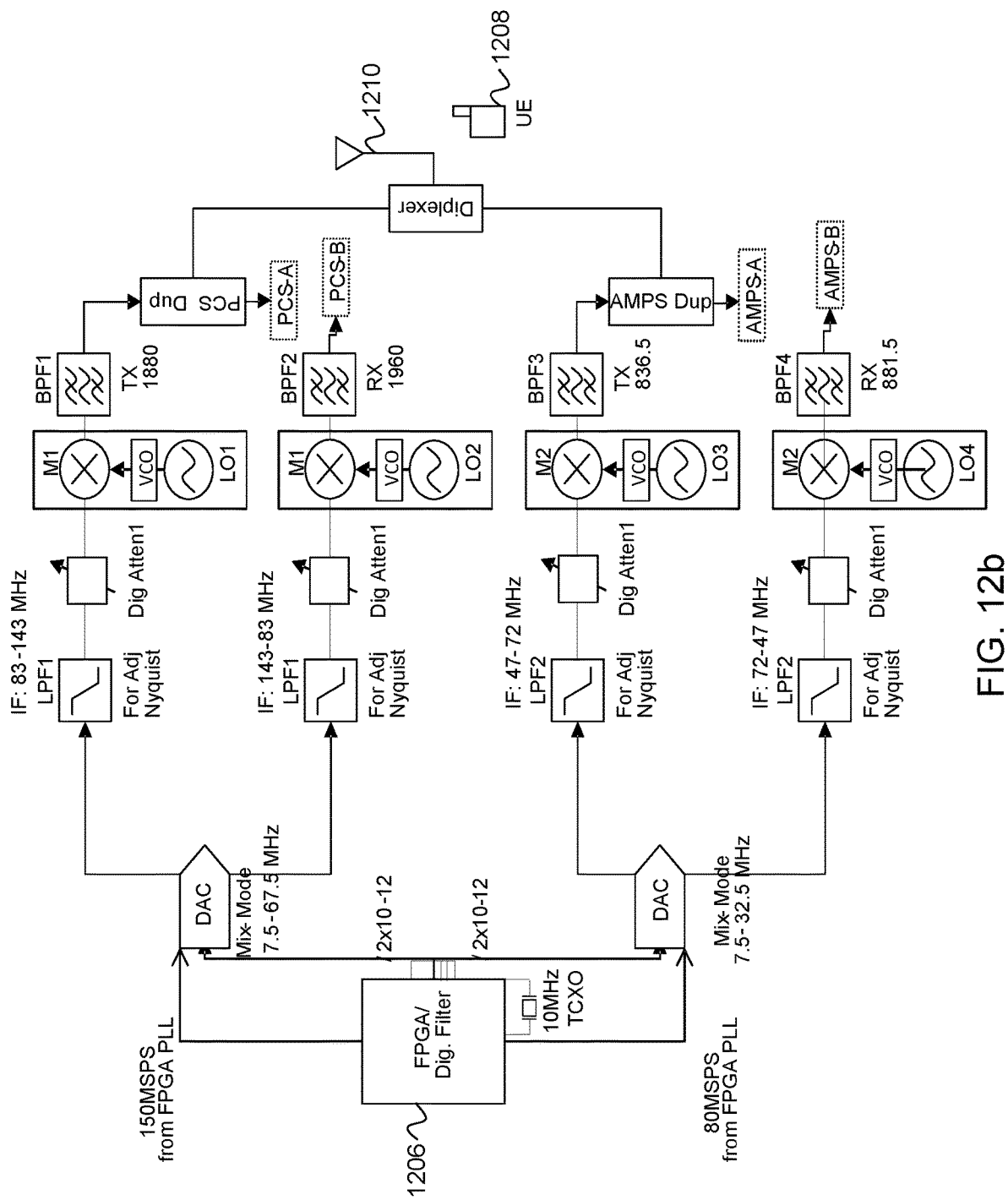

FIGS. 12a and 12b provide examples of channelization using a digital signal processor (DSP), such as a field programmable gate array, or another type of DSP. FIG. 12a illustrates a downlink path for a signal booster in which one or more signals transmitted from one or more base stations 1202 can be received at an antenna port 1204 of the signal booster as a broadband signal. The broadband signal can be down converted, filtered, amplified, and digitized using an analog to digital converter. The digitized signal can then be channelized using the DSP 1206. One or more channels in the digital signal can then be removed using the DSP 1206 to reduce an RSSI of the downlink and enable the gain of the UL signal to be increased by the signal booster.

Similarly, FIG. 12b illustrates a signal path for the signal booster in which the downlink filtered digital signal can be converted to an analog signal using a digital to analog converter, upconverted, and sent to an antenna port 1210 for transmission to one or more UEs 1208. The signal booster can then provide greater gain to the UL signal from the UE(s) 1208 based on the decreased RSSI.

In another example, antenna tuning can be used to reduce RSSI of selected channels in a band in order to maximize the gain of the UL signal. In one embodiment, an antenna with a rotating motor can auto-direct the antenna direction to avoid reducing gain by reducing the RSSI contribution of selected interfering channels. In another embodiment, an antenna can be selected from a plurality of antennas. The antenna that results in the highest UL gain, due to a lowest RSSI value of a broadband signal can be selected. In another embodiment, active beam steering can be used with an array of antennas to minimize the effects of one or more interfering DL channels within a band. In another example, an antenna can be tuned to a null of an undesired DL channel within the band. The antenna may use switched capacitor and inductor banks. The tuned antenna could be automated, which may require communication with the signal booster. Alternatively, the antenna could have its own detectors and microcontroller that can be used to determine what needs to be channelized and how to do it.

Figure 13:
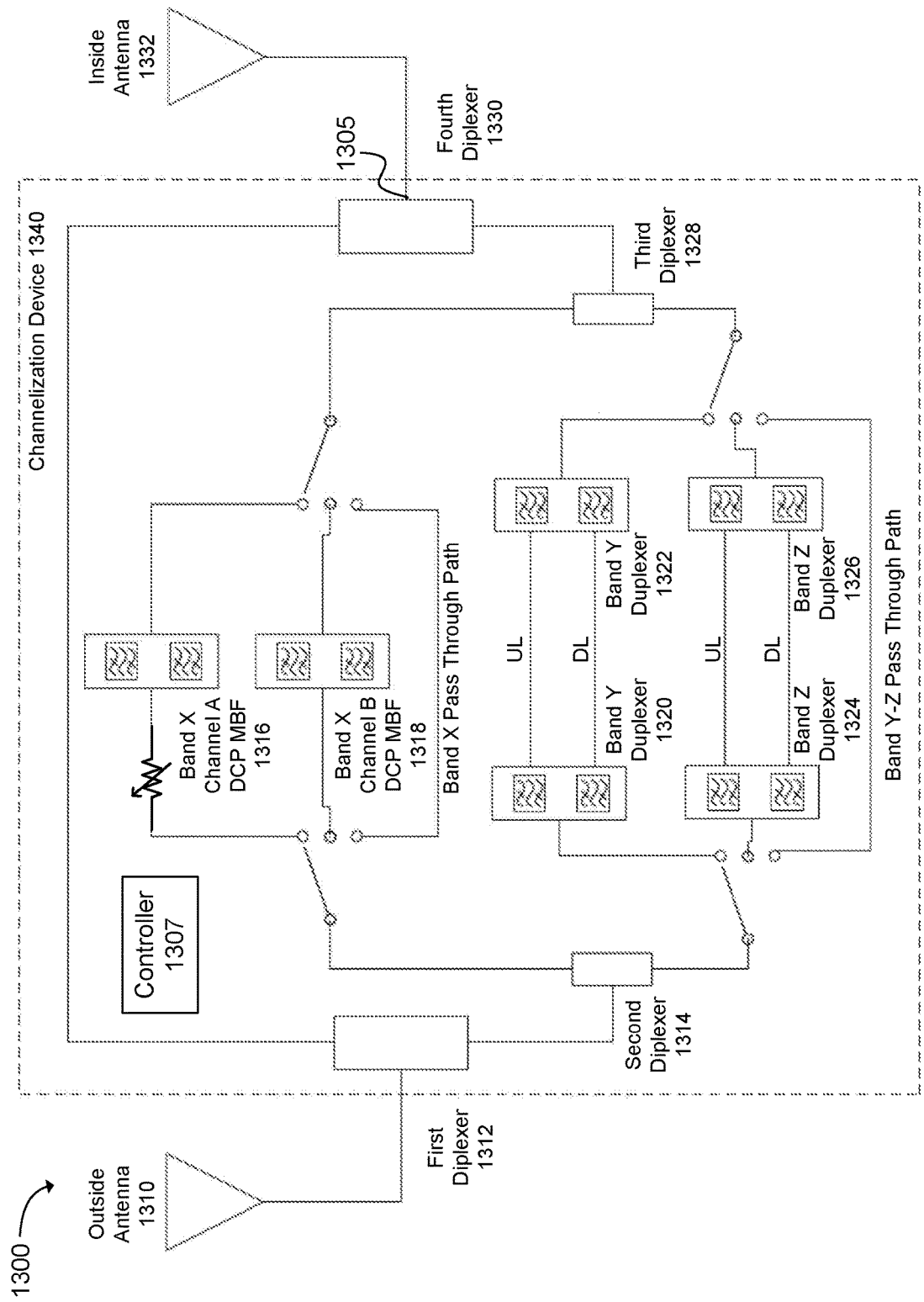
FIG. 13 illustrates a channelized box in accordance with an example.

FIG. 13 illustrates an exemplary channelization device 1340 in a wideband signal booster 1300 (or wideband repeater or bi-directional amplifier). The channelization device 1340 can include a plurality of switchable signal paths operable to perform channelized passive filtering of signals in defined bands. In addition, the channelization device 1340 can include a plurality of switchable pass through signal paths operable to pass through signals in the defined bands without filtering of the signals. In other words, the switchable pass through signal paths can bypass the switchable signal paths that perform the channelized passive filtering of the signals. The channelization device 1340 can be configured to perform passive filtering of signals with no amplification of the signals. The channelization device 1340 can include a variable attenuator for each defined band to enable separate signal attenuation for each defined band. In addition, the channelization device 1340 can operate in series with the wideband signal booster 1300.

In one example, the channelization device 1340 can be a passive channelization box that is manually or automatically adjustable to attenuate one signal that is passing through while not attenuating another signal. The channelization device 1340 can perform dynamically filtering of signals, as opposed to a statically configured filter box (as shown in the channelization box of FIG. 4). In the example of FIG. 4, inserting the channelization box would produce a given set of conditions, and a differently produced box would have to be selected in order to achieve a different type of configuration. In contrast, the channelization device 1340 shown in the example of FIG. 13 is configured to be switchable to switch in/out a wide variety of different signal paths and/or pass through signal paths. The channelization device 1340 can be configurable on-the-fly, as it can be user selectable without having to disconnect the system and change out the filter combinations.

In one example, the plurality of switchable signals paths can perform the channelized passive filtering of the signals in the defined bands when the wideband signal booster 1300 is exposed to a near-far base station scenario. The plurality of switchable pass through signal paths can pass through the signals in the defined bands without filtering of the signals while bypassing the plurality of switchable signals paths that perform the channelized passive filtering when the wideband signal booster 1300 is not exposed to the near-far base station scenario.

In a typical near-far base station scenario, a UE (e.g., a UE that is connected to the wideband signal booster 1300) can detect a signal with an increased RSSI from a base station located relatively near to the UE, and due to the signal with the increased RSSI, the UE may not detect a signal with a decreased RSSI (or not detect the signal at all) from a base station located relatively far from the UE. In other words, the UE can detect a stronger signal from the relatively near base station, which makes it difficult for the UE to detect a weaker signal from the relatively far base station. In one example, if both the relatively far base station and the relatively near base station transmit signals simultaneously at equal signal powers, then due to the inverse square law, the UE can receive more power from the nearer base station. Since one base station's transmitted signal is noise for the other base station, the signal-to-noise ratio (SNR) for the relatively far base station can be significantly lower, which makes signals transmitted from the relatively far base station difficult to detect at the UE. Thus, the near-far problem is one of detecting or filtering out a weaker signal amongst stronger signals.

As shown in FIG. 13, the channelization device 1340 can be communicatively coupled to an outside antenna 1310 of the wideband signal booster 1300 and an inside antenna 1332 of the wideband signal booster 1300. The outside antenna 1310 can communicate signals with a base station (not shown) and the inside antenna 1332 can communicate signals with a mobile device (not shown). The channelization device 1340 can include a first antenna port 1303 communicatively coupled to the outside antenna 1310 of the wideband signal booster 1300, as well as a second antenna port 1305 communicatively coupled to the inside antenna 1332 of the wideband signal booster 1300.

In one example, the channelization device 1340 can include a first diplexer 1312 and a fourth diplexer 1330. The first diplexer 1312 can be communicatively coupled to the outside antenna 1310 and the fourth diplexer 1320 can be communicatively coupled to the inside antenna 1332. In one example, the first diplexer 1312 and the fourth diplexer 1330 can be high band diplexers. Alternatively, the first diplexer 1312 and the fourth diplexer 1330 can be low band diplexers. The high band diplexers can pass high band signals and filter out low band signals, whereas the low band diplexers can pass low band signals and filter out high band signals.

In one example, the channelization device 1340 can include a second diplexer 1314 and a third diplexer 1328. The second diplexer 1314 can be communicatively coupled to the first diplexer 1312 and the third diplexer 1328 can be communicatively coupled to the fourth diplexer 1330. In one example, the plurality of switchable signal paths and the plurality of switchable pass through signal paths can be configured between the second diplexer 1314 and the third diplexer 1328. The plurality of switchable signal paths can perform passive filtering of signals in defined bands, whereas the plurality of switchable pass through signal paths can pass through signals in the defined bands without filtering of the signals.

In one example, a switchable signal path in the plurality of switchable signal paths can include a channelized analog RF bandpass filter. The channelized analog RF bandpass filter can include a downlink analog RF bandpass filter to filter one or more channels in a selected band of a downlink signal. In addition, the channelized analog RF bandpass filter can include an uplink analog RF bandpass filter to filter one or more channels in a selected band of an uplink signal.

In one example, a switchable signal path in the plurality of switchable signal paths can include a dual-common port multi-bandpass filter for filtering a signal in a selected channel of a defined band. In this example, switchable signal path(s) can be between the second duplexer 1314 and the third duplexer 1328. For example, a first switchable signal path can include a Band X Channel A DCP MBF 1316 and a second switchable signal path can include a Band X Channel B DCP MBF 1318. In this example, the first and second switchable signal paths can be for the same band (e.g., Band X), but for different channels within the band (e.g., Channel A and Channel B). In this example, the channelization device 1340 can also include a switchable pass through signal path for the same band (e.g., Band X).

In one example, a switchable signal path in the plurality of switchable signal paths can include one or more duplexers for filtering a signal in a defined band. In this example, switchable signal path(s) can be between the second duplexer 1314 and the third duplexer 1328. For example, a first switchable signal path can include a first Band Y duplexer 1320 and a second Band Y duplexer 1322, whereas a second switchable signal path can include a first Band Z duplexer 1324 and a second Band Z duplexer 1326. In this example, the first and second switchable signal paths can be for different bands (e.g., Band Y versus Band Z). Based on the two separate duplexers for each switchable signal path, signals in both the downlink and the uplink can be filtered accordingly. In this example, the channelization device 1340 can also include a switchable pass through signal path for Bands Y and Z (i.e., a Band Y-Z pass through signal path).

In one configuration, the plurality of switchable signal paths and the plurality of switchable pass through signal paths can be dynamically configured based on an instruction received from a controller 1307 of the wideband signal booster 1300. In other words, the controller 1307 can dynamically configure certain signal paths and/or pass through signal paths to be switched on (which causes other signal paths to be switched off). For example, the wideband signal booster 1300 can include a detector (not shown) to detect the power levels of signals, and this information can be provided to the controller 1307. Based on certain power levels, the controller 1307 can instruct certain signal paths and/or pass through signal paths to be switched on. In this example, the switchable signal paths and the switchable pass through signal paths can be automatically configured by the controller 1307 in the wideband signal booster 1300.

In another configuration, the plurality of switchable signal paths and the plurality of switchable pass through signal paths can be dynamically configured based on an instruction received from a user of the wideband signal booster 1300. In this example, the switchable signal paths and the switchable pass through signal paths can be manually configured by the user.

For example, based on a manual instruction received from the user, on B5, signals on Channel A can be passed and signals on Channel B can be filtered. As another example, on B12-13, B12 signals can be passed and B13 signals can be filtered. As yet another example, both B12 and B13 signals can be passed via a bypass path.

In yet another configuration, the plurality of switchable signal paths and the plurality of switchable pass through signal paths can be dynamically configured based on an instruction received from a remote server. In this example, the switchable signal paths and the switchable pass through signal paths can be remotely configured via the remote server.

In one configuration, the switchable signal paths and the switchable pass through signal paths can be operable for defined bands. The defined bands can include high bands and/or low bands from the 3GPP LTE set of operating bands. Examples of the high bands include: 3GPP LTE band 4 (B4) or band 25 (B25). Examples of the low bands include: 3GPP band 5 (B5), band 12 (B12) or band 13 (B13).

Figure 14:
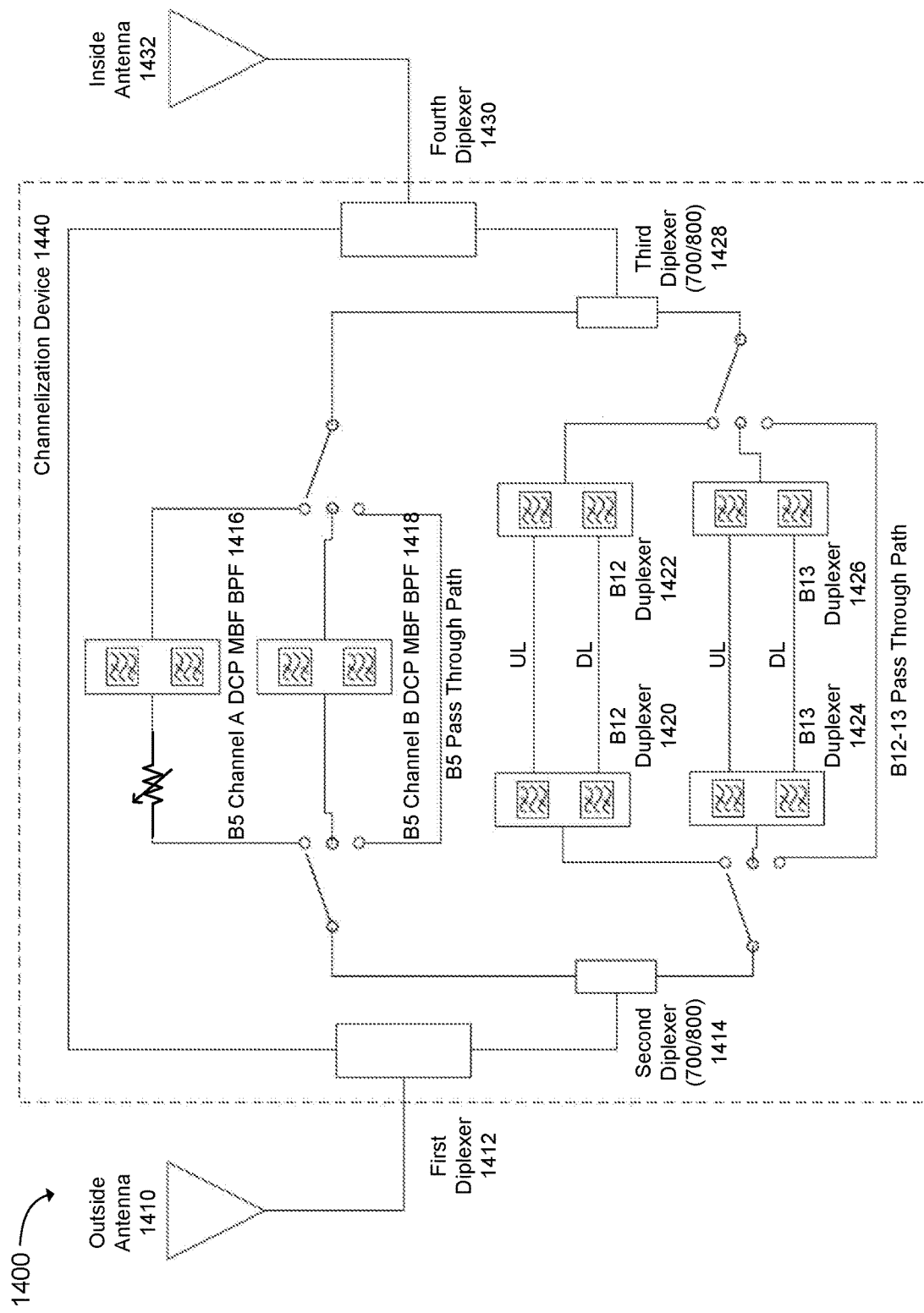
FIG. 14 illustrates a channelized box in accordance with an example.

FIG. 14 illustrates an exemplary channelization device 1440 in a wideband signal booster 1400 (or wideband repeater). The channelization device 1440 can be configured to perform passive filtering of signals with no amplification of the signals. The channelization device 1440 can perform passive filtering with no active gain blocks. The channelization device 1440 can include multiple bands/channels and multiple pass through paths that can be switched as desired. The channelization device 1440 can serve to dynamically filter signals in different bands or pass through signals in different bands, as opposed to a static channelization device (as shown in FIG. 4).

In one example, the channelization device 1440 can be communicatively coupled to an outside antenna 1410 of the wideband signal booster 1400 and an inside antenna 1432 of the wideband signal booster 1400. The channelization device 1440 can include a first diplexer 1412, a second diplexer 1414 (e.g., a 700/800 MHz diplexer), a third diplexer 1428 (e.g., a 700/800 MHz diplexer) and a fourth diplexer 1430.

In one example, a plurality of switchable signal paths can be between the second diplexer 1414 and the third diplexer 1428. For example, the switchable signal paths can include a B5 Channel, a DCP MBF 1416, or a B5 Channel B DCP MBF 1418, respectively. In another example, the switchable signal paths can include a pair of B12 duplexers 1420, 1422 or a pair of B13 duplexers 1424, 1426, respectively. The switchable signal path with the B12 duplexers can pass B12 signals and attenuate or filter out signals in other bands, whereas the switchable signal path with the B13 duplexers can pass B13 signals and attenuate or filter out signals in other bands. In addition, a plurality of switchable pass through signal paths can be between the second diplexer 1414 and the third diplexer 1428. For example, the switchable pass through signal paths can include a B5 pass through signal path and/or a B12-13 switchable pass through signal path.

In one example dual-common port (DCP) multi-bandpass filter (MBF) can be used for B5, B12, B13, and so on. In addition, duplexers can be used for B5, B12, B13, and so on.

In one example, the second diplexer 1414 (e.g., a 700/800 MHz diplexer) and the third diplexer 1428 (e.g., a 700/800 MHz diplexer) are applicable to the low bands. However, in an alternative configuration, the channelization device 1440 can include diplexers that are applicable to the high bands (e.g., B4 and B25).

Figure 15:
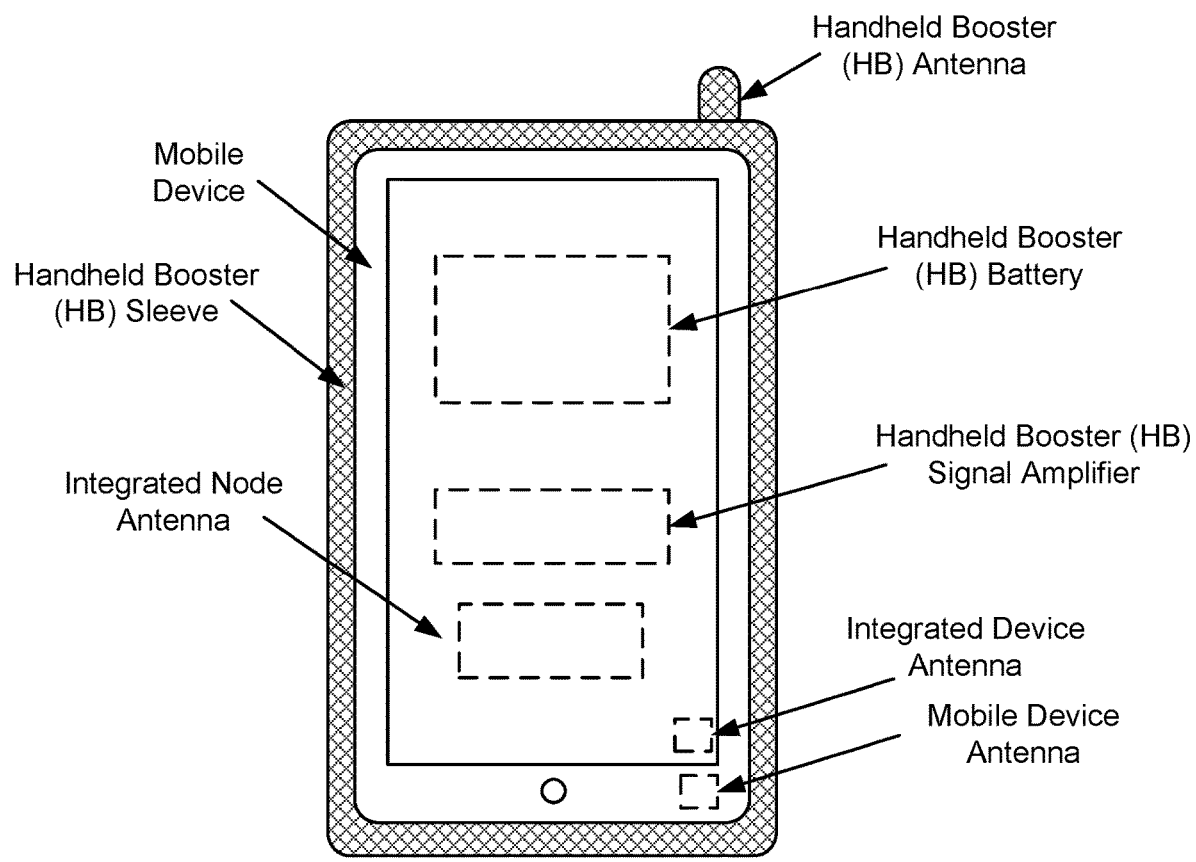
FIG. 15 illustrates a handheld booster in communication with a wireless device in accordance with an example.

While various embodiments described herein, and illustrated in FIGS. 1-15, have been described with respect to a cellular signal amplifier with an outside antenna and an inside antenna, this is not intended to be limiting. Channelization of downlink signals in order to increase BSCL values to reduce network sensitivity can also be accomplished using a handheld booster, as illustrated in FIG. 15. The handheld booster can include an integrated device antenna and the integrated node antenna that are typically used in place of the indoor antenna and outdoor antenna, respectively.

EXAMPLES

The following examples pertain to specific technology embodiments and point out specific features, elements, or actions that can be used or otherwise combined in achieving such embodiments.

Example 1 includes a method for increasing signal booster gain while maintaining network protections, comprising: estimating a distance from the signal booster to one or more base stations; calculating a base station coupling loss (BSCL) value at a frequency band of a downlink signal based on the estimated distance; and adjusting one or more of a gain and a noise power of an uplink signal of the frequency band at the signal booster based on the BSCL value to maintain the network protections.

Example 2 includes the method of Example 1, further comprising calculating the BSCL value of the downlink signal at one or more bands selected from third generation partnership project (3GPP) long term evolution (LTE) frequency bands: 2, 4, 5, 12, 13, 17, or 25.

Example 3 includes the method of any of Examples 1 to 2, further comprising calculating the BSCL value of the downlink signal at one or more bands selected from: third generation partnership project (3GPP) long term evolution (LTE) frequency division duplex (FDD) bands 1 through 33; or 3GPP LTE time division duplex (TDD) bands 34 through 44.

Example 4 includes the method of any of Examples 1 to 3, further comprising adjusting one or more of the gain and the noise power of the uplink signal of the frequency band at the signal booster when the BSCL value is less than a threshold value to maintain the network protections.

Example 5 includes the method of any of Examples 1 to 4, wherein estimating the distance further comprises one or more of: calculating the distance from the signal booster to the one or more base stations using a geographic coordinate system location of the signal booster and a geographic coordinate system location of the one or more base stations; or estimating the distance from the signal booster to the one or more base stations using a pilot signal timing; or estimating the distance from the signal booster to the one or more base stations based on the pilot signal timing and a difference in the geographic coordinate system location of the signal booster and the one or more base stations.

Example 6 includes the method of any of Examples 1 to 5, further comprising determining a source base station of a selected downlink signal received at the signal booster by comparing the calculated distance of the one or more base stations and the estimated distance of the selected downlink signal using the pilot signal timing to identify a substantially similar distance.

Example 7 includes the method of any of Examples 1 to 6, further comprising: determining a geographic location of the signal booster using a global positioning system; determining a geographic location of the one or more base stations using a global positioning system; and estimating the distance between the signal booster and the one or more base stations based on the determined geographic locations.

Example 8 includes the method of any of Examples 1 to 7, further comprising calculating the base station coupling loss (BSCL) value at the frequency band of the downlink signal over the estimated distance using an estimated loss per distance of a signal at the frequency band traveling through the earth's atmosphere.

Example 9 includes the method of any of Examples 1 to 8, further comprising calculating the base station coupling loss (BSCL) value at the frequency band of the downlink signal based on a signal loss terrain model for a location of the signal booster and the one or more base stations.

Example 10 includes the method of any of Examples 1 to 9, wherein the signal loss terrain model is for one or more of a country terrain, a flat terrain, a hilly terrain, a suburb terrain, a city terrain, a mountain terrain, a forest terrain, or a line of site terrain.

Example 11 includes a method for increasing signal booster gain while maintaining network protections using channelization, comprising: measuring a downlink signal at a plurality of channels for a selected band to determine a base station coupling loss (BSCL) at each of the plurality of channels; identifying a closest channel of the plurality of channels associated with a base station that is located nearest to the signal booster; determining a base station coupling loss (BSCL) value for the closest channel; and adjusting one or more of a gain and a noise power of an uplink signal of the signal booster based on the BSCL value of the closest channel to maintain the network protections.

Example 12 includes the method of Example 11, further comprising adjusting one or more of the gain and the noise power of an uplink signal of the signal booster based on the BSCL value of the closest channel when the BSCL value for the closest channel is less than a threshold value Example 13 includes the method of any of Examples 11 to 12, further comprising measuring the downlink signal at the plurality of channels in one or more of third generation partnership project (3GPP) long term evolution (LTE) frequency bands: 2, 4, 5, 12, 13, 17, or 25.

Example 14 includes the method of any of Examples 11 to 13, further comprising measuring the downlink signal at the plurality of channels in one or more bands selected from: third generation partnership project (3GPP) long term evolution (LTE) frequency division duplex (FDD) bands 1 through 33; or 3GPP LTE time division duplex (TDD) bands 34 through 44.

Example 15 includes the method of any of Examples 11 to 14, further comprising identifying the closest channel of the plurality of channels that is associated with the base station that is located nearest to the signal booster by determining a signal with a highest received signal strength indicator (RSSI) as the closest channel.

Example 16 includes the method of any of Examples 11 to 15, further comprising using a comb filter to receive the plurality of channels to enable delayed versions of each channel to be combined to determine the signal with the highest RSSI.

Example 17 includes the method of any of Examples 11 to 16, further comprising removing a BSCL contribution of one or more signals broadcast in the plurality of channels from a broadband BSCL value of the downlink signal based on one of a frequency range of the plurality of channels and a BSCL value of each of the plurality of channels.

Example 18 includes at least one machine readable storage medium having instructions embodied thereon for increasing signal booster gain using channelization while maintaining network protections, the instructions when executed by one or more processors, at a channelization device or at a signal booster, perform the following: measuring a downlink signal at a plurality of channels for a selected band to determine a base station coupling loss (BSCL) for the plurality of channels; determining a base station associated with each of the plurality of channels; disregarding a BSCL value for each channel of the plurality of channels associated with a base station when a signal booster user is not communicating with the base station; and adjusting one or more of a gain and a noise power of an uplink signal of the signal booster based on a selected BSCL value of a base station to which a user is communicating while maintaining the network protections.

Example 19 includes the at least one machine readable storage medium of Example 18, further comprising instructions that, when executed, perform the following: measuring the downlink signal at the plurality of channels in one or more of third generation partnership project (3GPP) long term evolution (LTE) frequency bands: 2, 4, 5, 12, 13, 17, or 25.

Example 20 includes the at least one machine readable storage medium of any of Examples 18 to 19, further comprising instructions that, when executed, perform the following: measuring the downlink signal at the plurality of channels in one or more bands selected from: third generation partnership project (3GPP) long term evolution (LTE) frequency division duplex (FDD) bands 1 through 33; or 3GPP LTE time division duplex (TDD) bands 34 through 44.

Example 21 includes the at least one machine readable storage medium of any of Examples 18 to 20, further comprising instructions that, when executed, perform the following: adjusting one or more of the gain and the noise power of the uplink signal of the signal booster based on the selected BSCL value, wherein the selected BSCL value is a lowest BSCL value of a base station to which one or more users are communicating.

Example 22 includes the at least one machine readable storage medium of any of Examples 18 to 21, further comprising instructions that, when executed, perform the following: measuring a broadband downlink signal at the signal booster to determine a broadband base station coupling loss (BSCL) at the signal booster; adjusting the broadband BSCL based on the disregarded BSCL value of each channel of the plurality of channels associated with a base station when a signal booster user is not communicating with the base station; and setting an uplink gain value of the signal booster based on the adjusted broadband BSCL.

Example 23 includes a channelization device for increasing signal booster gain while maintaining network protections, the channelized device comprising: a first diplexer configured to be coupled to a first interface port; a second diplexer configured to be coupled to a second interface port; and a channelized bandpass filter comprising a downlink filter configured to filter one or more channels in a selected band of a downlink signal and an uplink filter configured to filter one or more channels in a selected band of an uplink signal.

Example 24 includes the channelization device of Example 23, wherein the channelized bandpass filter is configured to communicate the one or more channels in the selected band to the signal booster to enable the signal booster to: measure a base station coupling loss (BSCL) value for the one or more channels in the selected band of the downlink signal; and set an uplink gain or a noise power of an uplink signal based on the BSCL value of the one or more channels.

Example 25 includes the channelization device of any of Examples 23 to 24, wherein the channelized bandpass filter is configured to substantially attenuate a channel with a base station coupling loss (BSCL) value that is less than a threshold BSCL value.

Example 26 includes the channelization device of any of Examples 23 to 25, wherein the channelization bandpass filter is a dual-common port (DCP) multi-bandpass filter (MBF) that includes two or more bandpass filters in a single package, wherein a first bandpass filter in the DCP MBF is configured for an uplink signal, and a second bandpass filter in the DCP MBF is configured for the downlink signal.

Example 27 includes the channelization device of any of Examples 23 to 26, further comprising: a third diplexer coupled to the channelized bandpass filter and located between the first diplexer and the channelized bandpass filter; a fourth diplexer coupled to the channelized bandpass filter and located between the second diplexer and the channelized bandpass filter on an opposite side of the channelized bandpass filter relative to the third diplexer; and a pass-through path coupled between the third diplexer and the fourth diplexer to allow signals to pass between the first interface port and the second interface port when the BSCL value for each of the one or more channels is greater than a threshold value.

Example 28 includes the channelization device of any of Examples 23 to 27, wherein the selected band is a third generation partnership project (3GPP) long term evolution (LTE) frequency band 2, 4, 5, 12, 13, 17, or 25.

Example 29 includes the channelization device of any of Examples 23 to 28, wherein the selected band is selected as one or more of: a third generation partnership project (3GPP) long term evolution (LTE) frequency division duplex (FDD) band 1 through 33; or a 3GPP LTE time division duplex (TDD) band 34 through 44.

Example 30 includes the channelization device of any of Examples 23 to 29, further comprising one or more amplifiers operatively coupled to the channelized bandpass filter and configured to set a noise power and provide sufficient amplification to the downlink signal to compensate for loss in the channelization device.

Example 31 includes the channelization device of any of Examples 23 to 30, wherein the one or more amplifiers are further configured to provide amplification to the downlink signal to compensate for downlink signal loss that occurs between the channelization device and the signal booster.

Example 32 includes a channelization device for assessing network sensitivity of a signal booster, the channelized device comprising: a downlink signal path including at least one downlink channelized filter configured to block at least one channel to enable an uplink gain of the signal booster to be increased; and an uplink signal path including at least one uplink channelized filter.

Example 33 includes the channelization device of Example 32, further comprising: a first diplexer configured to be coupled to a first interface port; a second diplexer configured to be coupled to a second interface port; and a pass-through path coupled between the first and second diplexer; wherein the downlink channelized filter and the uplink channelized filter are communicatively coupled to the first diplexer and the second diplexer.

Example 34 includes the channelization device of any of Examples 32 to 33, wherein the uplink channelized filter and the downlink channelized filter are comprised of one or more of a duplexer, a bandpass filter, a notch filter, a dual-common port (DCP) multi-bandpass filter (MBF), or a multi-common port (MCP) multi-bandpass filter (MBF).

Example 35 includes a channelization device for increasing signal booster gain while maintaining network protections, the channelized device comprising: a first diplexer configured to be coupled to a first interface port; a second diplexer configured to be coupled to a second interface port; and a channelized notch filter configured to filter one or more channels in a selected band of a downlink signal.

Example 36 includes the channelization device of Example 35, wherein the channelized notch filter is configured to communicate the one or more channels in the selected band to the signal booster to enable the signal booster to: measure a base station coupling loss (BSCL) value for the one or more channels; and set an uplink gain or a noise power of an uplink signal based on the BSCL value of the one or more channels.

Example 37 includes the channelization device of any of Examples 35 to 36, wherein the channelized notch filter is a dual-common port (DCP) multi-bandpass filter (MBF) notch filter that includes two or more bandpass filters in a single package, wherein a first bandpass filter in the DCP MBF is configured for an uplink signal, and a second bandpass filter in the DCP MBF is configured for the downlink signal.

Example 38 includes the channelization device of any of Examples 35 to 37, wherein the selected band is selected as one or more of: a third generation partnership project (3GPP) long term evolution (LTE) frequency division duplex (FDD) band 1 through 33; or a 3GPP LTE time division duplex (TDD) band 34 through 44.

Example 39 includes the channelization device of any of Examples 35 to 38, further comprising one or more amplifiers operatively coupled to the channelized notch filter and configured to set a noise power and provide sufficient amplification to the downlink signal to compensate for loss in the channelization device.

Example 40 includes the channelization device of any of Examples 35 to 39, wherein the one or more amplifiers are further configured to provide amplification to the downlink signal to compensate for downlink signal loss that occurs between the channelization device and the signal booster.

Example 41 includes an active channelization device for assessing network sensitivity of a signal booster, the channelized device comprising: a first interface port coupled to a first diplexer to receive a downlink signal from the signal booster; a second interface port coupled to a second diplexer; and a channelized filter configured to filter one or more channels in a selected band of the downlink signal.

Example 42 includes the active channelization device of Example 41, further comprising; a controller configured to: receive a gain reduction level of an uplink signal from the signal booster that is caused by a base station coupling loss (BSCL) value of the downlink signal; and measure a channelized base station coupling loss (BSCL) value for the one or more channels of the downlink signal; and an amplifier configured to amplify the uplink signal based on the channelized BSCL value and the received gain reduction level.

Example 43 includes the active channelization device of any of Examples 41 to 42, wherein the channelized filter comprises two or more filters that are one or more of a notch filter, a bandpass filter, a dual-common port (DCP) multi-bandpass filter (MBF) notch filter, or a dual-common port (DCP) multi-bandpass filters (MBF).

Example 44 includes the active channelization device of any of Examples 41 to 43, wherein the channelized filter is comprised of one or more of a radio frequency (RF) notch filter or an intermediate frequency (IF) notch filter.

Example 45 includes the active channelization device of any of Examples 41 to 44, wherein the RF notch filter or IF notch filter are configured to substantially block a selected channel in the downlink signal.

Example 46 includes the active channelization device of any of Examples 41 to 45, wherein the RF notch filter or the IF notch filter are configured to substantially block the selected channel in the downlink signal to increase the BSCL value and increase an uplink gain or noise power of the uplink signal.

Example 47 includes the active channelization device of any of Examples 41 to 46, further comprising a local oscillator (LO) configured to scan the selected band in the downlink signal to position one or more of the IF notch filters over a frequency of a selected channel in the downlink signal.

Example 48 includes the active channelization device of any of Examples 41 to 47, wherein the LO is configured to scan the selected band in the downlink signal to position one or more of the IF notch filters over the frequency of the selected channel in the downlink signal to increase the BSCL value and increase an uplink gain or noise power of the uplink signal.

Example 49 includes the active channelization device of any of Examples 41 to 48, further comprising a local oscillator (LO) configured to scan the selected band in the downlink signal to position two or more of the IF notch filters over a selected frequency of a channel in the downlink signal to increase the BSCL value and increase a gain or noise power of the uplink signal, wherein the two or more notch filters are added to a switched section to allow for a greater notch width to block one or more channels in the downlink signal to increase the BSCL value and increase a gain or noise power of the uplink signal.

Example 50 includes a method for increasing signal booster gain of a signal booster while maintaining network protections, comprising: receiving a wideband downlink signal with a base station coupling loss BSCL value; switching in two or more channelized filters, wherein each channelized filter is configured to filter a selected channel in the wideband downlink signal to form a channelized downlink signal; determining a BSCL value for each of the channelized downlink signals; and selecting the channelized filter associated with a selected BSCL value of each of the channelized downlink signals; and adjusting a gain or a noise power of the uplink signal at the signal booster based on the selected channelized filter while maintaining the network protections.

Example 51 includes the method of Example 50, wherein each channelized filter is comprised of radio frequency filters or intermediate frequency filters.

Example 52 includes the method of any of Examples 50 to 51, further comprising selecting the channelized radio frequency filters (RF) or channelized intermediate frequency (IF) filters that are associated with a lowest BSCL value of each of the channelized downlink signals when the two or more channelized radio frequency filters are notch filters, wherein the channelized RF filters or channelized IF filters are comprised of a DCP MPF filter that includes two or more bandpass filters in a single package.

Example 53 includes the method of any of Examples 50 to 52, further comprising selecting the channelized radio frequency filters or channelized intermediate frequency filters that are associated with a highest BSCL value of each of the channelized downlink signals when the two or more channelized radio frequency filters are bandpass filters.

Example 54 includes a method for increasing signal booster gain while maintaining network protections, comprising: receiving a wideband downlink signal with a base station coupling loss (BSCL) value; digitizing the wideband downlink signal to form a plurality of channelized downlink signals; determining a BSCL value for each of the plurality of channelized downlink signals; and using a digital filter to adjust a gain of one or more of the channelized downlink signals to optimize a gain for each channel based on network protection.

Example 55 includes the method of Example 54, further comprising using a digital filter to set a gain or a noise power to a maximum level of each of the channelized downlink signals based on the BSCL value for each of the channelized downlink signals.

Example 56 include a channelization device of a wideband repeater, the channelization device comprising: a first diplexer; a second diplexer; a plurality of switchable signal paths between the first diplexer and the second diplexer operable to perform channelized passive filtering of signals in defined bands; a channelized analog bandpass filter in each of the plurality of switchable signal paths, wherein the channelized analog bandpass filter comprises: a downlink analog bandpass filter configured to filter one or more channels in a selected band of a downlink signal; and an uplink analog bandpass filter configured to filter one or more channels in a selected band of an uplink signal; and one or more switchable pass through signal paths between the first diplexer and the second diplexer operable to pass through signals in the defined bands without filtering of the signals, wherein the channelization device is configured to perform channelized passive filtering of signals with no amplification of the signals.

Example 57 includes the channelization device of Example 56, wherein: the plurality of switchable signals paths are configured to perform the channelized passive filtering of the signals in the defined bands when the wideband repeater is exposed to a near-far base station scenario; and the one or more switchable pass through signal paths are configured to pass through the signals in the defined bands without filtering of the signals while bypassing the plurality of switchable signals paths that perform the channelized passive filtering when the wideband repeater is not exposed to the near-far base station scenario.

Example 58 includes the channelization device of any of Examples 56 to 57, wherein the channelized analog bandpass filter is an analog radio frequency (RF) bandpass filter for filtering one or more channels in the selected band of the downlink signal or the selected band of the uplink signal.

Example 59 includes the channelization device of any of Examples 56 to 58, wherein the channelized analog bandpass filter is a dual-common port (DCP) multi-bandpass filter (MBF) for filtering one or more channels in the selected band of the downlink signal or the selected band of the uplink signal.

Example 60 includes the channelization device of any of Examples 56 to 59, wherein the channelized analog bandpass filter is a duplexer for filtering one or more channels in the selected band of the downlink signal or the selected band of the uplink signal.

Example 61 includes the channelization device of any of Examples 56 to 60, further comprising logic for dynamically configuring the plurality of switchable signal paths and the one or more switchable pass through signal paths based on an instruction received from at least one of: a controller of the wideband repeater, a user of the wideband repeater or a remote server.

Example 62 includes the channelization device of any of Examples 56 to 61, wherein: the first diplexer is a first high band diplexer and the second diplexer is a second high band diplexer; or the first diplexer is a first low band diplexer and the second diplexer is a second low band diplexer.

Example 63 includes the channelization device of any of Examples 56 to 62, further comprising a variable attenuator for each defined band to enable separate signal attenuation for each defined band.

Example 64 includes the channelization device of any of Examples 56 to 63, further comprising: a first antenna port communicatively coupled to a first antenna of the wideband repeater; and a second antenna port communicatively coupled to a second antenna of the wideband repeater.

Example 65 includes the channelization device of any of Examples 56 to 64, wherein the channelization device is configured to operate in series with an active wideband repeater.

Example 66 includes the channelization device of any of Examples 56 to 65, wherein the defined bands include high bands or low bands, wherein the high bands include: third generation partnership project (3GPP) long term evolution (LTE) band 4 (B4) or band 25 (B25), and the low bands include: 3GPP LTE band 5 (B5), band 12 (B12) or band 13 (B13).

Example 67 includes a channelization device of a wideband repeater, the channelization device comprising: a first diplexer; a second diplexer; a plurality of switchable signal paths between the first diplexer and the second diplexer operable to perform channelized passive filtering of signals in defined bands; and a plurality of switchable pass through signal paths between the first diplexer and the second diplexer operable to pass through signals in the defined bands without filtering of the signals, wherein the channelization device is configured to perform channelized passive filtering of signals with no amplification of the signals.

Example 68 includes the channelization device of Example 67, wherein: the plurality of switchable signals paths are configured to perform the channelized passive filtering of the signals in the defined bands when the wideband repeater is exposed to a near-far base station scenario; and the plurality of switchable pass through signal paths are configured to pass through the signals in the defined bands without filtering of the signals while bypassing the plurality of switchable signals paths that perform the channelized passive filtering when the wideband repeater is not exposed to the near-far base station scenario.

Example 69 includes the channelization device of any of Examples 67 to 68, wherein a switchable signal path in the plurality of switchable signal paths includes an analog radio frequency (RF) bandpass filter for filtering a signal in a selected channel of a defined band.

Example 70 includes the channelization device of any of Examples 67 to 69, wherein a switchable signal path in the plurality of switchable signal paths includes a dual-common port (DCP) multi-bandpass filter (MBF) for filtering a signal in a selected channel of a defined band.

Example 71 includes the channelization device of any of Examples 67 to 70, wherein a switchable signal path in the plurality of switchable signal paths includes one or more duplexers for filtering a signal in a defined band.

Example 72 includes the channelization device of any of Examples 67 to 71, wherein the defined bands include high bands or low bands, wherein the high bands include: third generation partnership project (3GPP) long term evolution (LTE) band 4 (B4) or band 25 (B25), and the low bands include: 3GPP LTE band 5 (B5), band 12 (B12) or band 13 (B13).

Example 73 includes the channelization device of any of Examples 67 to 72, further comprising logic for dynamically configuring the plurality of switchable signal paths and the plurality of switchable pass through signal paths based on an instruction received from at least one: a controller of the wideband repeater, a user of the wideband repeater or a remote server.

Example 74 includes the channelization device of any of Examples 67 to 73, wherein: the first diplexer is a first high band diplexer and the second diplexer is a second high band diplexer; or the first diplexer is a first low band diplexer and the second diplexer is a second low band diplexer.

Example 75 includes the channelization device of any of Examples 67 to 74, further comprising a variable attenuator for each defined band to enable separate signal attenuation for each defined band.

Example 76 includes the channelization device of any of Examples 67 to 75, further comprising: a first antenna port communicatively coupled to a first antenna of the wideband repeater; and a second antenna port communicatively coupled to a second antenna of the wideband repeater.

Example 77 includes a wideband repeater, comprising: a first interface port; a second interface port; a channelization device communicatively coupled to the first interface port and the second interface port, the channelization device comprising: a first diplexer; a second diplexer; a plurality of switchable signal paths between the first diplexer and the second diplexer operable to perform channelized passive filtering of signals in defined bands; and a plurality of switchable pass through signal paths between the first diplexer and the second diplexer operable to pass through signals in the defined bands without filtering of the signals, wherein the channelization device is configured to perform channelized passive filtering of signals with no amplification of the signals.

Example 78 includes the wideband repeater of Example 77, wherein: the plurality of switchable signals paths are configured to perform the channelized passive filtering of the signals in the defined bands when the wideband repeater is exposed to a near-far base station scenario; and the plurality of switchable pass through signal paths are configured to pass through the signals in the defined bands without filtering of the signals while bypassing the plurality of switchable signals paths that perform the channelized passive filtering when the wideband repeater is not exposed to the near-far base station scenario.

Example 79 includes the wideband repeater of any of Examples 77 to 78, wherein a switchable signal path in the plurality of switchable signal paths includes one of: a dual-common port (DCP) multi-bandpass filter (MBF) or a duplexer for filtering a signal in a defined band.

Example 80 includes the wideband repeater of any of Examples 77 to 79, further comprising a controller operable to send an instruction to the channelization device for dynamically configuring the plurality of switchable signal paths and the one or more switchable pass through signal paths.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater, comprising:
   a signal path that includes a digital filter; and
   a controller operable to:
      receive a multi-channel downlink signal;
      digitize the multi-channel downlink signal to form a plurality of channelized downlink signals;
      determine a base station coupling loss (BSCL) value for each of the channelized downlink signals based on a received signal strength indicator (RSSI) for each of the channelized downlink channels; and
      use the digital filter to adjust a gain of one or more of the channelized downlink signals based on the BSCL value for each of the channelized downlink signals.

2. The repeater of claim 1, wherein the controller is further operable to use the digital filter to adjust the gain to optimize the gain for each channel based on network protection.

3. The repeater of claim 1, wherein the controller is further operable to use the digital filter to adjust a noise power of each of the channelized downlink signals based on the BSCL value for each of the channelized downlink signals.

4. The repeater of claim 1, wherein the gain is adjusted to a maximum level permitted by a Federal Communications Commission regulation.

5. The repeater of claim 1, wherein the gain is adjusted separately for each of the channelized downlink signals to produce different gain levels for the channelized downlink signals based on different BSCL values for each of the channelized downlink signals.

6. The repeater of claim 1, further comprising:
   a first diplexer; and
   a second diplexer,
   wherein the signal path is communicatively coupled between the first diplexer and the second diplexer.

7. The repeater of claim 1, further comprising:
   a first antenna port communicatively coupled to a first antenna of the wideband repeater; and
   a second antenna port communicatively coupled to a second antenna of the repeater.

8. The repeater of claim 1, wherein the controller is operable to receive the multi-channel downlink signal in a defined band, wherein the defined band is a low band or a high band, wherein the low band is third generation partnership project (3GPP) long term evolution (LTE) band 5 (B5), band 12 (B12) or band 13 (B13), and the high band is 3GPP LTE band 4 (B4) or band 25 (B25).

9. The repeater of claim 1, wherein the controller is a digital signal processor (DSP).

10. The repeater of claim 1, wherein the controller is configured to reduce a gain of one or more channels in the plurality of channelized downlink signals or remove one or more channels in the plurality of channelized downlink signals to reduce a received signal strength indicator (RSSI) of a downlink and enable a gain of an uplink signal to be increased by the repeater.

11. A signal booster, comprising:
   a first antenna port;
   a second antenna port;
   a signal path communicatively coupled between the first antenna port and the second antenna port, the signal path including a digital filter; and
   a digital signal processor (DSP) operable to:
      receive a multi-channel downlink signal;
      digitize the multi-channel downlink signal to form a plurality of channelized downlink signals;
      determine a base station coupling loss (BSCL) value for each of the channelized downlink signals based on a received signal strength indicator (RSSI) for each of the channelized downlink channels; and
      use the digital filter to adjust a gain of one or more of the channelized downlink signals based on the BSCL value for each of the channelized downlink signals.

12. The signal booster of claim 11, wherein the controller is further operable to use the digital filter to adjust the gain to optimize the gain for each channel while maintaining network protections.

13. The signal booster of claim 11, wherein the controller is further operable to use the digital filter to adjust a noise power of each of the channelized downlink signals based on the BSCL value for each of the channelized downlink signals.

14. The signal booster of claim 11, wherein the gain is adjusted to a maximum level permitted by a Federal Communications Commission regulation.

15. The signal booster of claim 11, further comprising:
   a first antenna port communicatively coupled to a first antenna of the signal booster; and
   a second antenna port communicatively coupled to a second antenna of the signal booster.

16. The signal booster of claim 11, wherein the controller is operable to receive the multi-channel downlink signal in a defined band, wherein the defined band is a low band or a high band, wherein the low band is third generation partnership project (3GPP) long term evolution (LTE) band 5 (B5), band 12 (B12) or band 13 (B13), and the high band is 3GPP LTE band 4 (B4) or band 25 (B25).

17. At least one machine readable storage medium having instructions embodied thereon, the instructions when executed by one or more processors perform the following:
   identifying, using a controller in a repeater, a multi-channel downlink signal;
   digitizing, using the controller, the multi-channel downlink signal to form a plurality of channelized downlink signals;
   determining, using the controller, a base statin coupling loss (BSCL) value for each of the channelized downlink signal based on a received signal strength indicator (RSSI) for each of the channelized downlink channels; and adjusting, using the controller and a digital filter included on a signal path of the repeater, a gain of one or more of the channelized downlink signals based on the BSCL value for each of the channelized downlink signals.

18. The at least one machine readable storage medium of claim 17, further comprising instructions when executed perform the following: adjusting, using the digital filter, the gain to optimize the gain for each channel based on network protection.

19. The at least one machine readable storage medium of claim 17, further comprising instructions when executed perform the following: adjusting, using the digital filter, a noise power of each of the channelized downlink signals based on the BSCL value for each of the channelized downlink signals.

20. The at least one machine readable storage medium of claim 17, wherein the gain is adjusted to a maximum level permitted by a Federal Communications Commission regulation.

21. The at least one machine readable storage medium of claim 17, wherein the gain is adjusted separately for each of the channelized downlink signals to produce different gain levels for the channelized downlink signals based on different BSCL values for each of the channelized downlink signals.

22. The at least one machine readable storage medium of claim 17, wherein the multi-channel downlink signal is in a low band or a high band, wherein the low band is third generation partnership project (3GPP) long term evolution (LTE) band 5 (B5), band 12 (B12) or band 13 (B13), and the high band is 3GPP LTE band 4 (B4) or band 25 (B25).

23. The at least one machine readable storage medium of claim 17, wherein the controller is a digital signal processor (DSP).

* * * * *